United States Patent [19]

Hares et al.

[11] 4,190,451
[45] Feb. 26, 1980

[54] PHOTOCHROMIC GLASS

[75] Inventors: George B. Hares; David L. Morse; Thomas P. Seward, III; Dennis W. Smith, all of Corning, N.Y.

[73] Assignee: Corning Glass Works, Corning, N.Y.

[21] Appl. No.: 14,981

[22] Filed: Feb. 28, 1979

Related U.S. Application Data

[63] Continuation-in-part of Ser. No. 887,677, Mar. 17, 1978, abandoned.

[51] Int. Cl.² ............... C03C 3/08; C03C 3/26; G02C 7/10
[52] U.S. Cl. .................. 106/47 Q; 65/30 E; 106/53; 106/54; 106/DIG. 6
[58] Field of Search ............. 106/DIG. 6, 54, 47 Q, 106/53

[56] References Cited

U.S. PATENT DOCUMENTS

| | | | |
|---|---|---|---|
| 3,795,523 | 3/1974 | Moriya et al. | 106/DIG. 6 |
| 3,957,499 | 5/1976 | DeMunn et al. | 106/54 |
| 3,998,647 | 12/1976 | Yamashita et al. | 106/DIG. 6 |
| 4,001,019 | 1/1977 | Yamashita et al. | 106/DIG. 6 |
| 4,018,965 | 4/1977 | Kerko et al. | 106/DIG. 6 |
| 4,102,693 | 7/1978 | Owen et al. | 106/54 |
| 4,130,437 | 12/1978 | Mazeau et al. | 106/DIG. 6 |

FOREIGN PATENT DOCUMENTS 2320913  3/1977  France .

OTHER PUBLICATIONS

Kirk-Othmer, Encyclopedia of Chemical Technology-10, (1966), pp. 596-597.

Primary Examiner—Helen M. McCarthy
Attorney, Agent, or Firm—Clinton S. Janes, Jr.

[57] ABSTRACT

The instant invention is concerned with transparent photochromic glass compositions which not only exhibit desirably rapid darkening and fading characteristics, but which also demonstrate the other physical and optical properties required for use in ophthalmic applications. Such glasses utilize the presence of silver chloride and/or silver bromide crystals to impart photochromic behavior in a narrowly-defined composition range within the alkali metal aluminoborosilicate base system. Copper ions are also included in the composition to perform as a sensitizing agent. The glasses have the capability of being either thermally tempered or chemically strengthened to comply with the United States Food and Drug Administration regulations for lenses used in ophthalmic applications. Improved independence of temperature effects upon the photochromic properties can be achieved where the copper level, expressed as CuO, is maintained between about 0.004-0.02% by weight, the chloride value, expressed as Cl, is held between about 0.1-0.25% by weight, the silver content, expressed as Ag, is included between about 0.15-0.3% by weight, and the quantity of bromide, expressed as Br, is varied between about 0.1-0.2% by weight. The fading rate of the glasses is enhanced by maintaining the molar ratio of alkali metal oxides to $B_2O_3$ between about 0.55-0.85, the molar ratio of alkali metal oxides minus $Al_2O_3$ to $B_2O_3$ is about 0.25-0.4, and the weight ratio Ag:(Cl+Br) is about 0.65-0.95.

8 Claims, 3 Drawing Figures

PHOTOCHROMIC GLASS

This is a continuation-in-part of our copending patent application Ser. No. 887,677, filed Mar. 17, 1978, now abandoned.

BACKGROUND OF THE INVENTION

The development of photochromic or phototropic glasses, as such have been variously termed, was founded in U.S. Pat. No. 3,208,860. As is explained in that specification, a photochromic glass becomes darker (changes color) when exposed to actinic radiation, most commonly ultraviolet radiation, and fades or returns to its original color when the actinic radiation is removed. That patent teaches the utility of silver halide crystals, viz., silver chloride, silver bromide, and silver iodide, and postulates an explanation of the mechanism underlying the photochromic behavior displayed by those glasses containing silver halide crystals. The patent is drawn generally to silicate-based glasses, with the preferred compositions being encompassed within the alkali metal oxide-$Al_2O_3$—$B_2O_3$—$SiO_2$ system. Thus, the preferred base compositions consist essentially, expressed in weight percent on the oxide basis, of about 4–26% $Al_2O_3$, 4–26% $B_2O_3$, and 40–76% $SiO_2$, wherein $R_2O$ is selected from the group of 2–8% $Li_2O$, 4–15% $Na_2O$, 6–20% $K_2O$, 8–25% $Rb_2O$, and 10–30% $Cs_2O$, the sum of the base glass ingredients constituting at least 85% of the total composition. The patent further observes the advantage of including small quantities of low temperature reducing agents, such as SnO, FeO, CuO, $As_2O_3$, and $Sb_2O_3$, to improve the photochromic characteristics of the glass. In order to impart photochromic behavior to the glass, at least one halide must be present in the glass in at least the effective amount of 0.2% Cl, 0.1% Br, and 0.08% I, and silver must be present in the minimum of 0.2% where Cl is the effective halide, 0.05% where Br is the effective halide, and 0.03% where I is the effective halide. Finally, where a transparent photochromic glass is desired, the glass must not contain more than 0.7% silver or more than 0.6% total of the three halides.

The most extensive use to date of photochromic glass has been in the field of ophthalmic lenses, both as prescription lenses and as non-prescription sunglasses. Prescription lenses, marketed under the trademark PHOTOGRAY®, have constituted the greatest segment of the commercial sales. That glass is encompassed within the disclosure of U.S. Pat. No. 3,208,860, supra, and has the approximate analysis recited below in weight percent:

| | |
|---|---|
| $SiO_2$ | 55.6% |
| $B_2O_3$ | 16.4 |
| $Al_2O_3$ | 8.9 |
| $Li_2O$ | 2.65 |
| $Na_2O$ | 1.85 |
| $K_2O$ | 0.01 |
| BaO | 6.7 |
| CaO | 0.2 |
| PbO | 5.0 |
| $ZrO_2$ | 2.2 |
| Ag | 0.16 |
| CuO | 0.035 |
| Cl | 0.24 |
| Br | 0.145 |
| F | 0.19 |

Inasmuch as PHOTOGRAY® glass is the result of compromises drawn between photochromic properties, ophthalmic properties, the capability for being chemically strengthened, and melting and forming behavior, considerable research has been undertaken to produce a glass having improved photochromic properties while still retaining the other necessary characteristics to be a practical commercial glass.

One circumstance which must be remembered in any such research is the fact that the dynamics of photochromic behavior exhibited by glasses are dependent to a greater or lesser extent upon the temperature of the glass and the intensity of the actinic radiation incident thereon. Hence, as a general rule, where other parameters are maintained constant, a photochromic glass will darken to a lower transmission when subjected to actinic radiation at lower temperatures and will fade more slowly when the actinic radiation is removed. Furthermore, the intensity of solar radiation can vary widely depending upon the season of the year, the location of the exposure (angle of declination of the sun), cloud cover, snow cover, air mass value, etc.

Some photochromic glass compositions have been produced which, in 2 mm thickness, will darken to a transmittance of less than 1% when exposed to solar radiation at low temperatures, e.g., −18° C. (0° F.). Such glasses do not conform to the common commercially-marketed, fixed tint sunglasses which customarily exhibit a transmittance of about 15%. Moreover, darkening to such low values may pose a substantial hazard to the wearer of ophthalmic lenses made from such glasses.

This relation of photochromic behavior to temperature has been termed the temperature dependence of a glass and refers to the loss of darkening exhibited by a glass as the temperature thereof is raised. This loss of darkening is due to the increase in thermal fade rate as the temperature of the glass is raised and can be very significant even over the limited temperature variations observed under ambient conditions, viz., a range from −18° C. to 40° C. (0°–100° F.).

It must also be borne in mind that the transmittance of a darkened photochromic glass sample is related in part to the thickness thereof. Thus, because of the absorption of the actinic radiation by the photochromic particles in the glass, the known photochromic glasses do not strictly adhere to Bouguer's Law. This circumstance assumes practical significance since, whereas the majority of ophthalmic lenses produced has a thickness dimension of 2–3 mm, there are some ophthalmologic conditions which demand lenses of greater thickness. Obviously, if Bouguer's Law held, such thick lenses (4 mm and greater) would manifest very low transmittances in the darkened state, especially at low temperatures. Nevertheless, even though Bouguer's Law is not strictly applicable, thick glasses do get darker than thin glasses.

Accordingly, because of those factors, the present applicants have deemed it advisable to restrict the minimum darkened transmittance of their glasses in 2 mm thickness to about 15% at low temperatures.

From the considerable experience gained through the years with photochromic glasses in the ophthalmic field, several criteria have been formulated therefor which would be highly desirable to achieve, these criteria being in addition to the necessary melting and forming capability as well as the conventional physical properties demanded in non-photochromic ophthalmic ware.

First, a glass which in 2 mm thickness at room temperatures (20°–30° C.) will demonstrate a luminous transmittance of at least about 90% before exposure to actinic radiation but which, when irradiated with actinic radiation, e.g., bright outdoor sunlight, will darken to a transmittance of less than 40%.

Second, a glass which in 2 mm thickness at room temperatures will fade very rapidly when removed from the incident actinic radiation; i.e., the glass will fade to a transmittance of at least 80% in less than two hours.

Third, a glass which in 2 mm thickness at −18° C. will darken to a transmittance of not less than about 15%.

Fourth, a glass which is capable of being strengthened via either thermal tempering or chemical strengthening while maintaining the desired photochromic properties.

Fifth, a glass having a base composition capable of refractive index adjustment while retaining the desired photochromic properties.

For the purposes of the present description, the luminous transmittance of a glass is defined as the value Y delineated in terms of the 1931 C.I.E. trichromatic colorimetric system utilizing the light source Illuminant C. This colorimetric system and light source are described by A. C. Hardy in the *Handbook of Colorimetry*, Technology Press, M.I.T., Cambridge, Massachusetts (1936).

This research to produce glasses displaying improved photochromic properties has led to investigations of other base glass systems. For example, U.S. Pat. No. 3,834,912 discloses glasses having base compositions within the PbO-$B_2O_3$ field, i.e., the glasses consist essentially, by weight, of 14.2–48% $B_2O_3$, 29–73% PbO, 0–15% alkaline earth metal oxides, 0–8% alkali metal oxides, and 0–23% $ZrO_2$, $Al_2O_3$, and/or ZnO. AgCl, AgBr, and/or AgI crystals impart the desired photochromic properties and up to 0.8% CuO and/or up to 0.05% $Cr_2O_3$ are noted as having utility as sensitizers. U.S. Pat. No. 3,876,436 is directed to base glass compositions in the $Al_2O_3$-$P_2O_5$ field, i.e., the glasses consist essentially, by weight, of at least 17% $P_2O_5$, 9–34% of $Al_2O_3$, not more than 40% $SiO_2$, not more than 19% $B_2O_3$, and at least 10% alkali metal oxides. Again, AgCl, AgBr, and AgI crystals provide the photochromic properties.

However, the lead borate-based glasses frequently encounter melting and forming problems and can be deficient with respect to chemical durability. The phosphate-based glasses can also be subject to less than satisfactory durability and, whereas some compositions exhibit fast fading characteristics, those fast fading glasses are observed to darken below 5% transmittance in 2 mm thickness when subjected to actinic radiation at −18° C.

Consequently, because of the practical advantages of glasses having compositions within the aluminoborosilicate base field with regard to physical properties other than photochromic behavior, as well as the relative ease in melting and forming, much activity has centered around attempts to improve the photochromic behavior in glasses having compositions within that base. Such research has fostered the trial of photochromic ingredients other than the silver halides. For example, U.S. Pat. No. 3,325,299 is drawn to silicate glasses and, preferably, aluminoborosilicate glasses wherein copper and/or cadmium halide crystals constitute the photochromic ingredients. Nevertheless, the effectiveness of materials other than the silver halides to provide the desired photochromic characteristics has not as yet supported a commercial product. Accordingly, the bulk of the investigative effort has been directed to silver halide-containing glasses having base compositions within the alkali metal aluminoborosilicate system. A recent illustration of such activity is shown in French Pat. No. 2,320,913.

That patent discloses photochromic glasses which are asserted to be particularly suitable for ophthalmic lenses to be worn by automobile drivers at twilight or at night. The glasses described therein are stated to have a saturation transmittance to visible light in 2 mm thickness of between 40–45% and are claimed to be capable of fading from the darkened state at 20° C. to a visible transmittance of at least 80% after no more than 30 minutes. The glasses have base compositions within the ranges of, as expressed in weight percent:

| | |
|---|---|
| $SiO_2$ | 45–62% |
| $B_2O_3$ | 9–22 |
| $Al_2O_3$ | 4–14 |
| $ZrO_2$ | 0–4.2 |
| MgO | 0–2.8 |
| BaO | 3–10.5 |
| $Li_2O$ | 0.8–4.6 |
| $Na_2O$ | 0.3–10 |
| $K_2O$ | 0–10 |
| F | 0–1 |

The most critical feature of the patented compositions is declared to reside in maintaining the proportions of $Ag_2O$, CuO, PbO, Cl, and Br within the analyzed ranges recited below in weight percent:

| | |
|---|---|
| $Ag_2O$ | 0.195–0.265 |
| CuO | 0.026–0.038 |
| PbO | 2.76–5.50 |
| Cl | 0.220–0.450 |
| Br | 0.080–0.200 |

Two factors relating to halide contents are also noted in that patent. First, that the fade rate of the claimed glass compositions is not enhanced through increased proportions of bromide and/or chloride. Second, an increase in bromide and/or chloride content adversely affects the darkening tendency of the glass, i.e., the glasses do not darken to as low an optical transmittance.

Another recent disclosure concerned with silver halide-containing glasses having base compositions within the alkali metal aluminoborosilicate system is U.S. Pat. No. 4,018,965. That patent is expressly drawn to glass compositions especially suitable for chemical strengthening and demonstrating the necessary melting and forming capabilities for sheet drawing. The glasses recited therein have the base compositions recited below in weight percent on the oxide basis:

| | |
|---|---|
| $SiO_2$ | 54–66% |
| $Al_2O_3$ | 7–15 |
| $B_2O_3$ | 10–25 |
| $Li_2O$ | 0.5–4 |
| $Na_2O$ | 3.5–15 |
| $K_2O$ | 0–10 |
| PbO | 0–3 |
| Ag | 0.1–1 |
| Cl | 0.1–1 |

-continued

| | |
|---|---|
| Br | 0–3 |
| F | 0–2.5 |
| CuO | 0.008–0.16 |
| $Li_2O + Na_2O + K_2O$ | 6–16 |

The patent also describes the optional inclusion of up to 1% total of transition metal oxide colorants and up to 5% total of rare earth metal oxide colorants.

Such glasses do indeed exhibit excellent modulus of rupture values after chemical strengthening and the compositions can be so adjusted as to provide exceptional sheet forming capabilities. However, an improvement in photochromic behavior with respect to fade rate would be desirable. Moreover, the patent makes no reference whatever to the temperature dependence displayed by the glasses so, obviously, does not define glass compositions which demonstrate relative independence of temperature effects.

Another borosilicate photochromic glass designed for prescription ophthalmic lenses has been marketed under the name PHOTOVITAR. The glass has the approximate analysis reported below in weight percent:

| | |
|---|---|
| $SiO_2$ | 54.0 |
| $B_2O_3$ | 16.5 |
| $Al_2O_3$ | 8.9 |
| $Li_2O$ | 2.37 |
| $K_2O$ | 1.88 |
| MgO | 2.42 |
| BaO | 9.7 |
| PbO | 0.6 |
| $ZrO_2$ | 1.9 |
| Ag | 0.14 |
| F | 0.19 |
| Cl | 0.59 |
| Br | 0.18 |
| CuO | 0.015 |

That glass demonstrates good darkening and fading characteristics in the ranges of room temperature but fails to darken a desired amount at higher temperatures and exhibits a transmittance of less than 15% at −18° C.

Yet another disclosure describing glass compositions assertedly demonstrating very fast fading capabilities is found in U.S. Pat. No. 4,102,693. The glasses are stated to exhibit a half fading time of not more than 60 seconds, half fading time being defined as the period required to fade from the darkened state to a condition in which half of the lost light transmittance has been restored. The compositions are free from barium and consist essentially, in weight percent, of

| | |
|---|---|
| $SiO_2$ | 31–59% |
| $B_2O_3$ | 18–28 |
| $Al_2O_3$ | 8–20 |
| $Li_2O$ | 0–3 |
| $Na_2O$ | 0–8 |
| $K_2O$ | 0–16 |
| $Li_2O+Na_2O+K_2O$ | 6–16 |
| $Ag_2O$ | 0.05–4 |
| Cl | 0.04–0.5 |
| Br | 0–1.0 |
| F | 0–0.2 |
| Cl+Br+F | 0.13–1 |
| CuO | 0–1 |

A number of optional components is mentioned to modify such physical properties of the glass as refractive index, although none of the working examples reported has a refractive index as high as 1.523, the level required for ophthalmic applications.

As is evident from the above-recited compositions, the range of glass suitable for the purposes of the patent is very broad. This is quite understandable since the disclosure is explicitly directed to glasses demonstrating extremely fast fading capabilities with no regard to other facets of photochromic behavior, e.g., the phenomenon of temperature dependence. Hence, the patent does not indicate the temperature at which the studies of photochromic behavior exhibited by the exemplary glasses were conducted. No comparative data measured at different temperatures are provided. Accordingly, no information can be gleaned therefrom as to means for producing photochromic glasses displaying low temperature dependence.

Still another description of index corrected photochromic glass compositions which are characterized by extremely fast fading capabilities is found in U.S. Pat. No. 3,957,499. The glasses are asserted to fade so rapidly that at least 65% and up to in excess of 80% of the optical density gained during darkening is lost within a five-minute fading interval. The glasses consist essentially, expressed in weight percent on the oxide basis as calculated from the batch, of:

| | |
|---|---|
| $SiO_2$ | 49–60 |
| $Al_2O_3$ | 2–9 |
| $B_2O_3$ | 15–18 |
| $Na_2O$ | 6–12 |
| $ZrO_2$ | 9–18 |
| Ag | 0.5–0.9 |
| Cl | 0.5–0.8 |
| CuO | 0.01–0.03 |
| PbO | 0.3–1 |

Optional ingredients include 0–6% $K_2O$, 0–3% $Li_2O$, 0–4% BaO, 0–1% MgO, 0–2% $TiO_2$, 0–0.5% Br, and 0–0.5% I. The crux of the invention is observed to be the use of increased quantities of $ZrO_2$ to replace at least part, if not all, of the BaO and PbO conventionally utilized in controlling the refractive index of the glass for ophthalmic purposes.

Nevertheless, again there is no discussion regarding the temperature dependence of the photochromic properties demonstrated by the glasses. No comparative data over a range of temperatures are provided.

In summary, none of the disclosures has provided any substantive teaching regarding temperature dependence which would help to satisfy the several criteria outlined previously, so research has been constant to produce glasses demonstrating even better physical, optical, and photochromic properties. This research has led to the development of sophisticated apparatus and tools to assist in the screening and understanding of photochromic glasses.

Thus, inasmuch as it was known that photochromic glasses were sensitive to radiations in the ultraviolet and low visible portions of the spectrum, an ultraviolet lamp has long been customarily employed as a convenient source of actinic radiation to test the photochromic behavior of glass specimens. Nevertheless, it has been appreciated that frequently there was poor correlation between the data secured with the ultraviolet lamp and the results observed through solar exposure outdoors. Accordingly, in order to achieve correlations with outdoor solar exposure, a "solar simulator" was devised.

The solar simulator apparatus, described in U.S. Pat. No. 4,125,775, is grounded in a 150 watt xenon arc source fitted with a filter to modify the spectral output thereof so as to closely approximate the solar spectrum, especially in the ultraviolet, blue, and red portions. The infrared region of the spectrum is attenuated with a layer of water of sufficient thickness to provide equal irradiance to that of the sun, but without great concern for its spectral distribution in that region.

The intensity of the arc source was adjusted such that the amount of darkening was identical to that of a number of commercially-available photochromic glasses, including PHOTOGRAY ® lens blanks, darkened outdoors at noon during a cloudless early summer day in Corning, New York (air mass value of about 1.06). Numerous experimental photochromic glasses of widely-variant compositions were also subjected to the solar simulator and to outdoor sunlight. Excellent overall agreement was observed in comparisons between the data obtained.

In order to continuously monitor the darkened transmittance of the specimens, each sample was interrogated with a chopped beam of light from a tungsten-halogen lamp detected by a PIN silicon photodiode whose output was demodulated by a lock-in amplifier. A composite color filter was placed into the beam to approximate the luminous response of the human eye under Illuminant C, as defined by C.I.E.

For measurements conducted at 26°–27° C. and 37°–38° C., the apparatus was interfaced to a PDP-11/04 computer (marketed by Digital Equipment Corporation, Maynard, Massachusetts) to enable automatic sample change, temperature selection, event sequencing, and data collection, storage, reduction, and retrieval with a minimum of operator's involvement.

Measurements at −18° C., 0° C., 20° C. and 40° C. were manually conducted with the samples mounted in a vacuum chamber with fused silica windows allowing entrance of the darkening light and passage of the interrogation beam. This permitted attaining temperatures substantially deviant from ambient and prevented condensation of atmospheric moisture on the sample at the lower temperatures. The sample holder consisted essentially of a copper plate, with a hole in the center for passage of the interrogation beam, which was heated or cooled by flowing a gaseous stream of the desired temperature through an attached heat exchange channel. The temperature of the gas was controlled by passing it through a coil immersed into liquid nitrogen and then over an electrically heated element controlled by a thermocouple impinging on the sample surface. The sample was mounted on the holder by means of a thermally conductive paste. The transmittance of the sample during darkening and fading cycles was recorded on a strip chart recorder.

Exposure of PHOTOGRAY ® lens blanks and PHOTOVITAR glass samples of 2 mm thickness to the solar simulator yielded the following average values recited below. $T_D$ designates the darkened transmittance and $T_{F5}$ indicates the transmittance of the sample five minutes after removal of the sample from exposure.

| PHOTOVITAR | | | | PHOTOGRAY ® | | | |
|---|---|---|---|---|---|---|---|
| Exposure Temperature | Exposure Time | $T_D$ | $T_{F5}$ | Exposure Temperature | Exposure Time | $T_D$ | $T_{F5}$ |
| 40° C. | 20 min. | 62% | 86% | 40° C. | 20 min. | 58.5% | 76.5% |
| 20° C. | 30 min. | 41% | 70% | 20° C. | 20 min. | 47% | 61% |
| 0° C. | 30 min. | 23.5% | 46.5% | 0° C. | 20 min. | 37.5% | 47.5% |
| −18° C. | 60 min. | 13% | 22% | −18° C. | 20 min. | 31.5% | 37.5% |

Several general conclusions can be drawn from the above data. Thus, the glasses darken to a lower transmittance when exposed at lower temperatures. The PHOTOVITAR glass does not darken to a great extent at high temperatures, but darkens to very low values at low temperatures. The PHOTOVITAR glass exhibits more rapid fading than PHOTOGRAY ® lens blanks, but neither glass fades very rapidly at low temperatures. This sluggishness in fade rate at low temperatures, however, may not be of significant practical importance since, in many instances, the glass will be warming up while it is fading. For example, the wearer will be coming indoors from being outdoors on a cold day and, as can be seen from the above comparisons, the fade rate increases as the temperature rises. Finally, the PHOTOGRAY ® lenses display less temperature dependence than the PHOTOVITAR glass.

OBJECTIVE OF THE INVENTION

The primary objective of the instant invention is the production of transparent photochromic glass which, in the preferred embodiment, will be suitable for ophthalmic applications and which, in 2 mm thickness, will exhibit the following photochromic behavior:

(a) at about 20° C., the glasses will darken to below 40% transmittance in the presence of actinic radiation, e.g., bright outdoor sunlight; the glasses will fade at least 30 percentage units of transmittance after five minutes' removal from the actinic radiation; and the glasses will fade to a transmittance in excess of 80% in no more than two hours after being removed from the actinic radiation;

(b) at about 40° C., the glasses will darken to below 55% transmittance in the presence of actinic radiation, e.g., bright outdoor sunlight; the glasses will fade at least 25 percentage units of transmittance after five minutes' removal from the actinic radiation; and the glasses will fade to a transmittance in excess of 80% in no more than two hours after being removed from the actinic radiation;

(c) at about −18° C., the glasses will not darken below 15% transmittance in the presence of actinic radiation, e.g., bright outdoor sunlight;

(d) the glasses are capable of being strengthened via thermal tempering or chemical strengthening while maintaining the desired photochromic properties; and (e) the glasses have compositions susceptible of refractive index adjustment without loss of the desired photochromic properties.

SUMMARY OF THE INVENTION

That objective can be achieved in glass compositions which in their broadest terms consist essentially, in weight percent on the oxide basis, of 0–2.5% $Li_2O$, 0–9% $Na_2O$, 0–17% $K_2O$, 0–6% $Cs_2O$, 8–20% $Li_2O+$-

$Na_2O+K_2O+Cs_2O$, 14-23% $B_2O_3$, 5-25% $Al_2O_3$, 0-25% $P_2O_5$, 20-65% $SiO_2$, 0.004-0.02% CuO, 0.15-0.3% Ag, 0.1-0.25% Cl, and 0.1-0.2% Br. When less than about 5% $P_2O_5$ is present in the composition, the minimum $SiO_2$ content will range about 45%. Various compatible metal oxides such as those recited below in the indicated amounts may be included to improve the melting and forming capabilities of the glass and/or to modify the physical and optical properties thereof: 0-6% $ZrO_2$, 0-3% $TiO_2$, 0-0.5% PbO, 0-7% BaO, 0-4% CaO, 0-3% MgO, 0-6% $Nb_2O_5$, and 0-4% $La_2O_3$. Up to about 2% F may also be included to assist melting of the glass. Finally, colorant oxides may optionally be included in the glass compositions. In general, such additions may consist of up to 1% total of transition metal coloring oxides, e.g., CoO, NiO, and $Cr_2O_3$ and/or up to 5% total of rare earth metal oxides, e.g., $Er_2O_3$, $Pr_2O_3$, $Ho_2O_3$, and $Nd_2O_3$. In general, the sum of all extraneous additions to the base glass will not exceed about 10%. The optimum photochromic properties are normally secured where the "photochromic elements" are maintained within the following ranges; i.e., where the CuO is included in amounts between 0.005-0.011%, the Ag is held between 0.175-0.225%, the Cl is maintained between 0.12-0.225%, and the Br is present between 0.1-0.15%. Furthermore, in the preferred compositions, the molar ratio of alkali metal oxide:$B_2O_3$ will preferably be maintained between about 0.55-0.85, if the glass is essentially free from divalent metal oxides other than CuO, the weight ratio of Ag:(Cl+Br) will preferably be held at values between about 0.65-0.95, and the molar ratio of (alkali metal oxide minus $Al_2O_3$):$B_2O_3$, i.e., ($R_2O$-$Al_2O_3$):$B_2O_3$, preferably ranges between about 0.25-0.4. Where $ZrO_2$ and/or $Nb_2O_5$ is present in the glass, the molar ratio of (alkali metal oxide minus $Al_2O_3$ minus $ZrO_2$ and/or minus $Nb_2O_5$):$B_2O_3$, i.e., ($R_2O$-$Al_2O_3$-$ZrO_2$ and/or $Nb_2O_5$):$B_2O_3$, will preferably range between about 0.25-0.4. These latter two ranges may not be applicable when the $P_2O_5$ content is about 5% or greater.

DESCRIPTION OF PREFERRED EMBODIMENTS

Figure 2:
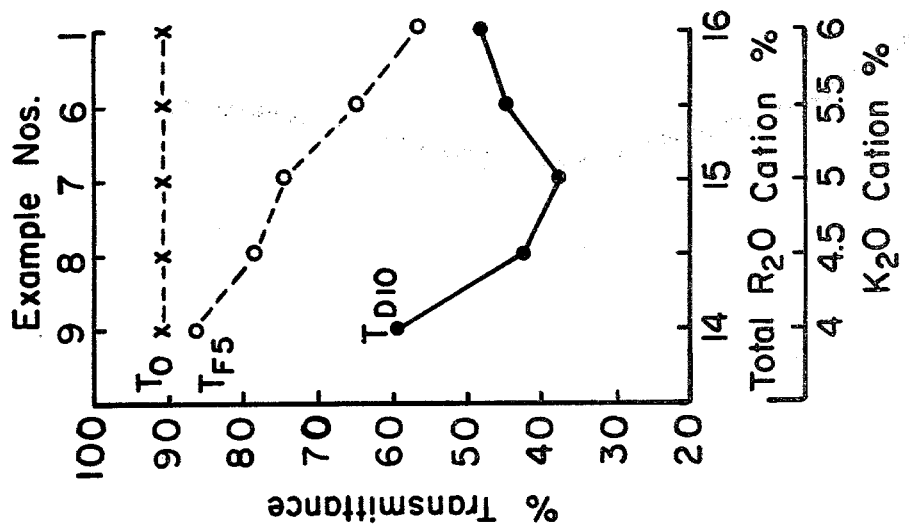
FIG. 2 is a graph illustrating the effect which changes in $K_2O$ content can have upon the photochromic properties of a glass having the same base composition, including total alkali metal oxide content, but wherein the $K_2O$ concentration is varied.

Table I sets forth several batch compositions which help to illustrate the parameters of the instant invention, particularly the importance of the alkali metal oxide:$B_2O_3$ molar ratio and the relation of alkali metal content to the photochromic elements. The components of the base glass are recorded in parts by weight on the oxide basis as calculated from the batch. However, inasmuch as it is not known with which cation(s) the halides are combined, they are simply reported as the halide, e.g., bromide and chloride, in accordance with conventional glass analysis practice. The silver content of photochromic glass has most customarily been reported as the metal Ag, and that practice is followed here. Since the sum of the constituents of each composition cited totals or closely approximates 100, for all practical purposes the values tabulated can be deemed to reflect weight percent.

The actual batch ingredients can comprise any materials, either the oxide or other compound, which, when melted together with the other ingredients, will be converted into the desired oxide in the proper proportions. For convenience, the halides were commonly added as alkali metal halides. The silver component was normally included as $AgNO_3$ or $Ag_2O$.

The batch ingredients were compounded, blended together thoroughly in a ball mill to assist in achieving a homogeneous melt, and then dispensed into a platinum crucible. The crucibles were covered, placed in a laboratory furnace operating at about 1450° C., and the batches melted for three hours and stirred. Both two pound and 20 pound batches were melted in this manner. The melts were poured into patties about 4"×8"×¼" on a steel plate and those patties transferred to an annealer operating at about 375° C. Numerous analyses of halides and silver in the glass bodies were made since these ingredients are subject to volatilization.

It will be appreciated, of course, that larger melts of glass can be made, where desired, in pots or continuous melting tanks and, where ophthalmic applications are envisioned, lens blanks can be pressed therefrom in the conventional manner. Volatilization of halides and silver in such commercial melting practices can be held below 20% and, with care, below 10%.

To aid in understanding the variations made in the exemplary compositions, the base glass constituents (excluding the photochromic elements Ag, Cl, Br, and CuO) are recited in Table IA in terms of cation percent and in Table IB in terms of mole percent. The molar ratio of alkali metal oxides ($R_2O$):$B_2O_3$ is also recorded in Table IB as is the molar ratio ($R_2O$-$Al_2O_3$):$B_2O_3$.

TABLE I

| | 1 | 2 | 3 | 4 | 5 | 6 | 7 | 8 | 9 |
|---|---|---|---|---|---|---|---|---|---|
| $SiO_2$ | 62.76 | 62.74 | 62.71 | 62.69 | 62.66 | 62.84 | 62.92 | 63.00 | 63.08 |
| $Al_2O_3$ | 9.49 | 9.49 | 9.48 | 9.48 | 9.48 | 9.50 | 9.51 | 9.53 | 9.54 |
| $Li_2O$ | 1.85 | 1.85 | 1.85 | 1.85 | 1.85 | 1.86 | 1.86 | 1.86 | 1.86 |
| $Na_2O$ | 3.85 | 3.52 | 3.20 | 2.88 | 2.56 | 3.85 | 3.86 | 3.86 | 3.86 |
| $K_2O$ | 5.84 | 5.84 | 5.84 | 5.84 | 5.84 | 5.36 | 4.88 | 4.40 | 3.92 |
| $B_2O_3$ | 16.20 | 16.55 | 16.91 | 17.26 | 17.61 | 16.58 | 16.96 | 17.35 | 17.73 |
| CuO | 0.012 | 0.012 | 0.012 | 0.012 | 0.012 | 0.012 | 0.012 | 0.012 | 0.012 |
| Ag | 0.3 | 0.3 | 0.3 | 0.3 | 0.3 | 0.3 | 0.3 | 0.3 | 0.3 |
| Cl | 0.18 | 0.18 | 0.18 | 0.18 | 0.18 | 0.18 | 0.18 | 0.18 | 0.18 |
| Br | 0.2 | 0.2 | 0.2 | 0.2 | 0.2 | 0.2 | 0.2 | 0.2 | 0.2 |

TABLE IA

| | 1 | 2 | 3 | 4 | 5 | 6 | 7 | 8 | 9 |
|---|---|---|---|---|---|---|---|---|---|
| $SiO_2$ | 50.5 | 50.5 | 50.5 | 50.5 | 50.5 | 50.5 | 50.5 | 50.5 | 50.5 |
| $Al_2O_3$ | 9.0 | 9.0 | 9.0 | 9.0 | 9.0 | 9.0 | 9.0 | 9.0 | 9.0 |
| $Li_2O$ | 6.0 | 6.0 | 6.0 | 6.0 | 6.0 | 6.0 | 6.0 | 6.0 | 6.0 |
| $Na_2O$ | 6.0 | 5.5 | 5.0 | 4.5 | 4.0 | 6.0 | 6.0 | 6.0 | 6.0 |
| $K_2O$ | 6.0 | 6.0 | 6.0 | 6.0 | 6.0 | 5.5 | 5.0 | 4.5 | 4.0 |
| $B_2O_3$ | 22.5 | 23.0 | 23.5 | 24.0 | 24.5 | 23.0 | 23.5 | 24.0 | 24.5 |

TABLE IB

| | 1 | 2 | 3 | 4 | 5 | 6 | 7 | 8 | 9 |
|---|---|---|---|---|---|---|---|---|---|
| $SiO_2$ | 67.1 | 67.1 | 67.1 | 67.1 | 67.1 | 67.1 | 67.1 | 67.1 | 67.1 |
| $Al_2O_3$ | 6.0 | 6.0 | 6.0 | 6.0 | 6.0 | 6.0 | 6.0 | 6.0 | 6.0 |
| $Li_2O$ | 4.0 | 4.0 | 4.0 | 4.0 | 4.0 | 4.0 | 4.0 | 4.0 | 4.0 |
| $Na_2O$ | 4.0 | 3.6 | 3.3 | 3.0 | 2.6 | 4.0 | 4.0 | 4.0 | 4.0 |
| $K_2O$ | 4.0 | 4.0 | 4.0 | 4.0 | 4.0 | 3.6 | 3.3 | 3.0 | 2.6 |
| $B_2O_3$ | 14.9 | 15.3 | 15.6 | 15.9 | 16.3 | 15.3 | 15.6 | 15.9 | 16.3 |
| $R_2O$:$B_2O_3$ | 0.80 | 0.76 | 0.72 | 0.69 | 0.65 | 0.76 | 0.72 | 0.69 | 0.65 |

TABLE IB-continued

|  | 1 | 2 | 3 | 4 | 5 | 6 | 7 | 8 | 9 |
|---|---|---|---|---|---|---|---|---|---|
| ($R_2O$-$Al_2O_3$):$B_2O_3$ | 0.40 | 0.37 | 0.34 | 0.31 | 0.28 | 0.37 | 0.34 | 0.31 | 0.28 | after removal thereof from the solar simulator darkening source; and $T_{F5}$-$T_{D10}$ reports the amount of fading from the darkened state demonstrated by the sample after five minutes. This latter value, termed "5 minute fade" in the art, is useful as a measure of fade rate of each glass.

TABLE IC

| 27° C. Exposure Temperature | 1 | 2 | 3 | 4 | 5 | 6 | 7 | 8 | 9 |
|---|---|---|---|---|---|---|---|---|---|
| $T_{D10}$ | 48% | 43% | 38% | 48% | 62% | 45% | 38% | 44% | 60% |
| $T_{F5}$ | 57% | 65% | 76% | 83% | 88% | 66% | 75% | 79% | 87% |
| $T_{F5} - T_{D10}$ | 9% | 22% | 38% | 35% | 26% | 21% | 37% | 35% | 27% |
| 38° C. Exposure Temperature | 1 | 2 | 3 | 4 | 5 | 6 | 7 | 8 | 9 |
| $T_{D10}$ | 51% | 51% | 53% | 64% | 74% | 53% | 51% | 58% | 71% |
| $T_{F5}$ | 68% | 77% | 83% | 88% | 91% | 77% | 83% | 86% | 90% |
| $T_{F5} - T_{D10}$ | 17% | 26% | 30% | 24% | 17% | 24% | 32% | 28% | 19% |
| −18° C. Exposure Temperature |  |  |  |  |  |  |  |  |  |
| $T_{D10}$ | — | — | 24% | — | — | — | — | — | — |

To permit careful control of silver halide phase precipitation growth, thereby insuring uniformity and reproducibility of photochromic properties, glasses having the potential for exhibiting photochromic behavior are customarily subjected to a heat treatment. Hence, it has been appreciated that the photochromic behavior of a glass is dependent upon the thermal history to which the glass is subject. Such heat treatments generally range between about the transformation range and the softening point of the glass. It is well-recognized that the rate of precipitation growth is dependent upon temperature, such that particle growth is generally more rapid at higher temperatures, provided the solubility temperature is not exceeded. Care must be exercised, however, to prevent the development of particle growth to such sizes that haze or translucency is imparted to the glass. Sometimes a low temperature "nucleating" treatment is initially applied which is followed by a higher temperature treatment to precipitate more material on the nuclei formed during the earlier treatment. Such a two-step heat treatment is thought to yield an even more uniformly-sized crystal development. The particles are believed to be precipitated as liquid droplets with crystallization of the droplets occurring at temperatures below about 450° C. as the glass is cooled to room temperature after heat treatment.

The glass compositions of Table I were exposed to such a two-step treatment. Thus, the samples were heated to 550° C., held thereat for about 30 minutes, and then heated to 650° C. and maintained thereat for about 30 minutes. Table IC reports the photochromic properties observed in 2 mm thick ground and polished plates of the exemplary compositions listed in Table I utilizing exposures from the solar simulator at temperatures of about 27° and 38° C. In Table IC, $T_{D10}$ represents the darkened transmittance of the glass after a ten minute exposure to the solar simulator darkening source; $T_{F5}$ indicates the transmittance of the glass five minutes Another group of specimens from the compositions of Table I was exposed to a single step heat treatment. Table ID reports the photochromic properties exhibited by the specimens after being heated to 660° C., held at that temperature for 30 minutes, and then quickly cooled to room temperature. Measurements were conducted at 27° C., 38° C., and −18° C. The legends of the table have the same significance as those set out in Table IC.

TABLE ID

|  | 27° C. Exposure | | | | | | | | |
|---|---|---|---|---|---|---|---|---|---|
|  | 1 | 2 | 3 | 4 | 5 | 6 | 7 | 8 | 9 |
| $T_{D10}$ | 54 | 45 | 42 | 50 | 59 | 43 | 38 | 43 | 58 |
| $T_{F5}$ | 60 | 64 | 72 | 83 | 88 | 63 | 70 | 77 | 87 |
| $T_{F5} - T_{D10}$ | 6 | 19 | 30 | 33 | 29 | 20 | 32 | 34 | 29 |
|  | 38° C. Exposure | | | | | | | | |
|  | 1 | 2 | 3 | 4 | 5 | 6 | 7 | 8 | 9 |
| $T_{D10}$ | 57 | 51 | 52 | 64 | 71 | 48 | 47 | 56 | 69 |
| $T_{F5}$ | 67 | 75 | 81 | 88 | 91 | 73 | 79 | 84 | 90 |
| $T_{F5} - T_{D10}$ | 10 | 24 | 29 | 24 | 20 | 25 | 32 | 28 | 21 |
|  | −18° C. Exposure | | | | | | | | |
|  | 1 | 2 | 3 | 4 | 5 | 6 | 7 | 8 | 9 |
| $T_{D10}$ | 55 | 42 | 32 | 23 | 18 | 41 | 33 | 29 | 19 |

Table IE records values in weight percent for the photochromic elements as analyzed via X-ray fluorescence. The weight ratio Ag:(Cl+Br) is also recited therein.

TABLE IE

|  | 1 | 2 | 3 | 4 | 5 | 6 | 7 | 8 | 9 |
|---|---|---|---|---|---|---|---|---|---|
| CuO | 0.011 | 0.009 | 0.009 | 0.010 | 0.009 | 0.008 | 0.011 | 0.009 | 0.009 |
| Ag | 0.194 | 0.193 | 0.187 | 0.184 | 0.184 | 0.192 | 0.189 | 0.186 | 0.186 |
| Cl | 0.122 | 0.126 | 0.111 | 0.119 | 0.113 | 0.117 | 0.123 | 0.113 | 0.127 |
| Br | 0.115 | 0.108 | 0.104 | 0.102 | 0.100 | 0.111 | 0.109 | 0.106 | 0.109 |
| Ag:(Cl + Br) | 0.82 | 0.82 | 0.87 | 0.83 | 0.86 | 0.84 | 0.81 | 0.815 | 0.79 |

A review of the above Tables illustrates that, in general, where the remainder of the glass composition is held essentially constant, especially the photochromic elements, the alkali metal oxide:$B_2O_3$ molar ratio has a very pronounced effect upon the photochromic properties of the glass. Hence, the glasses having high alkali metal oxide contents (Example 1) demonstrate low fade rates, whereas the glasses having low alkali metal oxide contents (Examples 5 and 9) manifest high fade rates but do not darken very much. Table ID demonstrates that the alkali metal content plays a role in the low temperature behavior of the glass as well as in the high temperature levels. Stated differently, glasses of low alkali metal oxide content will customarily exhibit high temperature dependence behavior. The optimum total alkali metal oxide content for the glasses appearing in Table I appears to be about 17 cation percent with the molar ratio of alkali metal oxide:$B_2O_3$ ranging between about 0.7–0.75. Likewise, the optimum molar ratio of (alkali metal oxide-$Al_2O_3$):$B_2O_3$ is seen to range between about 0.31–0.35.

Figure 1:
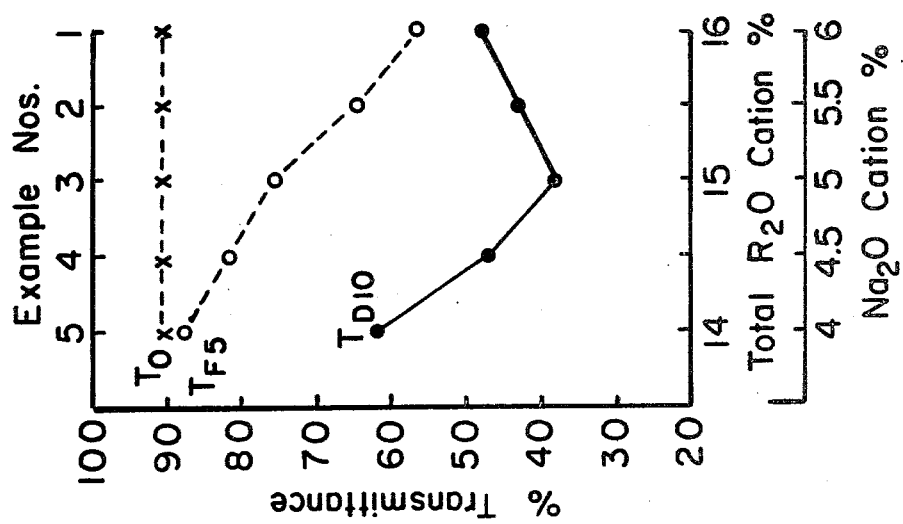
FIG. 1 is a graph illustrating the effect which changes in $Na_2O$ content can have upon the photochromic properties of a glass having the same base composition, including total alkali metal oxide content, but wherein the $Na_2O$ concentration is varied.
Figure 3:
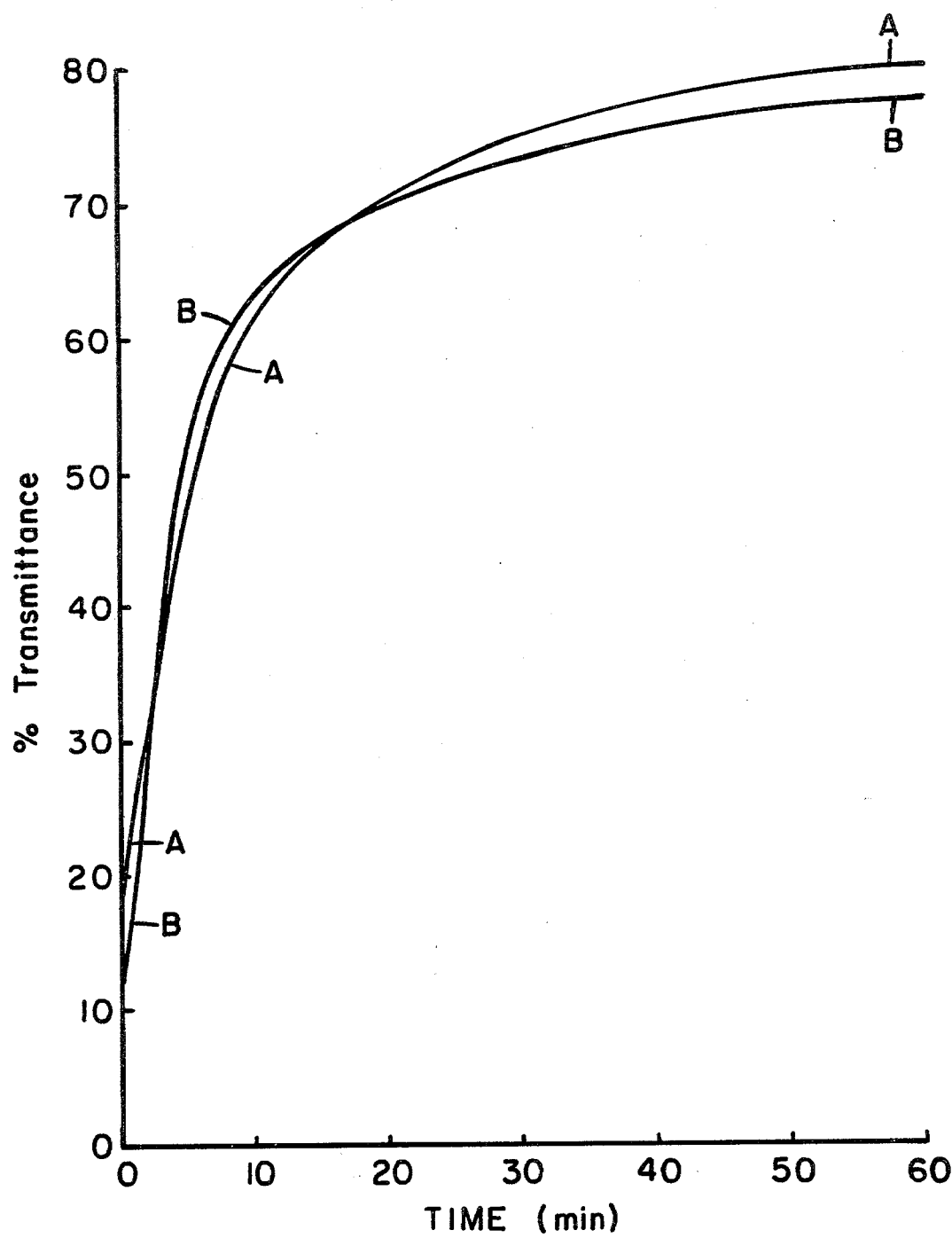

FIGS. 1 and 2 graphically illustrate the effect of alkali metal content on the photochromic properties. Thus, Examples 1–5 are plotted along the abscissa of FIG. 1 to demonstrate the effect resulting from adjustments in total alkali metal oxide ($R_2O$) content and, specifically, the $Na_2O$ content. Numerals 14, 15, and 16 along the abscissa of the graph represent the total alkali metal oxide of the glasses expressed in cation percent, whereas figures 4, 4.5, 5, 5.5, and 6, also plotted along the abscissa, represent the $Na_2O$ content of the glasses expressed in cation percent. Examples 1 and 6–9 in FIG. 2 show a like effect through variations in $K_2O$ content. Numerals 14, 15, and 16 along the abscissa of the glass have the same meaning as in FIG. 1, whereas figures 4, 4.5, 5, 5.5, and 6, also plotted along the abscissa, represent the $K_2O$ content of the glasses expressed in cation percent. $T_o$ represents the initial transmittance of each glass; $T_{D10}$ indicates the transmittance of the glass after a ten minute exposure at 27° C. to the solar simulator darkening source; and $T_{F5}$ records the transmittance of the glass at 27° C. five minutes after removal thereof from the solar simulator darkening source.

Adherence to the molar ratio $R_2O$:$B_2O_3$ of about 0.55–0.85, when the remainder of the glass composition is maintained essentially constant, is vital to achieve the objectives of the invention. It is believed that the efficacy of this relation is founded in a change in the coordination of boron on heat treatment which allows the silver halide to separate out in the proper proportions for optimum darkening and fading.

Likewise, as was noted above, the molar ratio ($R_2O$-$Al_2O_3$):$B_2O_3$ is also useful for determining optimum photochromism. Thus, experience has shown that the most desirable darkening and facing characteristics are developed when that ratio is about 0.31–0.35. Examples 3 and 7 of Table I have this ratio at a level of about 0.34.

An extremely important facet of the instant invention was the discovery that it is possible to reduce the temperature dependence of darkening of the photochromic glasses without decreasing the fading rate thereof via lowering the halide content with respect to the silver content.

Table II records several batch compositions in parts by weight, Table IIA lists the base components therefor in cation percent, and Table IIB lists the base components therefor in mole percent, which demonstrates the effect upon temperature dependence resulting from decreasing the halide content with respect to silver content. The batches were compounded, mixed, melted, formed, and annealed in like manner to those described in Table I. The molar ratios $R_2O$:$B_2O_3$ and ($R_2O$-$Al_2O_3$):$B_2O_3$ are also tabulated in Table IIB.

TABLE II

|  | 10 | 11 | 12 | 13 |
|---|---|---|---|---|
| $SiO_2$ | 62.92 | 62.92 | 62.92 | 62.92 |
| $Al_2O_3$ | 9.51 | 9.51 | 9.51 | 9.51 |

TABLE II-continued

|  | 10 | 11 | 12 | 13 |
|---|---|---|---|---|
| $B_2O_3$ | 16.96 | 16.96 | 16.96 | 16.96 |
| $Li_2O$ | 1.86 | 1.86 | 1.86 | 1.86 |
| $Na_2O$ | 3.86 | 3.86 | 3.86 | 3.86 |
| $K_2O$ | 4.88 | 4.88 | 4.88 | 4.88 |
| CuO | 0.012 | 0.012 | 0.012 | 0.012 |
| Ag | 0.3 | 0.3 | 0.3 | 0.3 |
| Cl | 0.18 | 0.24 | 0.30 | 0.42 |
| Br | 0.2 | 0.2 | 0.2 | 0.2 |

TABLE IIA

|  | 10 | 11 | 12 | 13 |
|---|---|---|---|---|
| $SiO_2$ | 50.5 | 50.5 | 50.5 | 50.5 |
| $Al_2O_3$ | 9.0 | 9.0 | 9.0 | 9.0 |
| $B_2O_3$ | 23.5 | 23.5 | 23.5 | 23.5 |
| $Li_2O$ | 6.0 | 6.0 | 6.0 | 6.0 |
| $Na_2O$ | 6.0 | 6.0 | 6.0 | 6.0 |
| $K_2O$ | 5.0 | 5.0 | 5.0 | 5.0 |

TABLE IIB

|  | 10 | 11 | 12 | 13 |
|---|---|---|---|---|
| $SiO_2$ | 67.1 | 67.1 | 67.1 | 67.1 |
| $Al_2O_3$ | 6.0 | 6.0 | 6.0 | 6.0 |
| $B_2O_3$ | 15.6 | 15.6 | 15.6 | 15.6 |
| $Li_2O$ | 4.0 | 4.0 | 4.0 | 4.0 |
| $Na_2O$ | 4.0 | 4.0 | 4.0 | 4.0 |
| $K_2O$ | 3.3 | 3.3 | 3.3 | 3.3 |
| $R_2O$:$B_2O_3$ | 0.72 | 0.72 | 0.72 | 0.72 |
| ($R_2O$-$Al_2O_3$):$B_2O_3$ | 0.34 | 0.34 | 0.34 | 0.34 |

Table IIC reports analyses of the photochromic elements, expressed in weight percent, made of Examples 10–14 along with the weight ratio Ag:(Cl+Br). All of the values tabulated were determined utilizing an X-ray emission technique.

TABLE IIC

|  | 10 | 11 | 12 | 13 |
|---|---|---|---|---|
| CuO | 0.006 | 0.010 | 0.010 | 0.008 |
| Ag | 0.185 | 0.179 | 0.170 | 0.160 |
| Cl | 0.113 | 0.168 | 0.194 | 0.239 |
| Br | 0.107 | 0.102 | 0.093 | 0.084 |
| Ag:(Cl + Br) | 0.84 | 0.66 | 0.59 | 0.50 |

The glass patties of Table II were subjected to a two-step heat treatment to develop photochromic behavior, this treatment consisting of heating to 550° C., maintaining that temperature for 30 minutes, and then heating to 675° C. and holding thereat for 30 minutes. Table IID recites the photochromic properties displayed by 2 mm thick ground and polished plates of Examples 10–13 utilizing exposure from the solar simulator darkening source at temperatures of about 26°, 37°, and −18° C. The legends of Table IID have the same meaning as those delineated in Table IC. $T_{D15}$ indicates the darkened transmittance of the glass after a fifteen minute exposure to the solar simulator darkening source.

TABLE IID

| 26° C. Exposure Temperature | 10 | 11 | 12 | 13 |
|---|---|---|---|---|
| $T_{D10}$ | 37% | 42% | 44% | 50% |
| $T_{F5}$ | 72% | 80% | 78% | 82% |
| $T_{F5} - T_{D10}$ | 35% | 38% | 34% | 32% |
| 37° C. Exposure |  |  |  |  |

TABLE IID-continued

| Temperature | 10 | 11 | 12 | 13 |
|---|---|---|---|---|
| $T_{D10}$ | 46% | 58% | 58% | 61% |
| $T_{F5}$ | 80% | 87% | 86% | 86% |
| $T_{F5} - T_{D10}$ | 34% | 29% | 28% | 25% |
| −18° C. Exposure | | | | |
| Temperature | 10 | 11 | 12 | 13 |
| $T_{D15}$ | 33% | 20.5% | 18.5% | 16.5% |

As can be seen, increases in halide content lead to less darkening of the glasses at high temperatures and a lower darkened transmittance of the glasses at cold temperatures, both of which trends are undesirable.

As has been indicated above, providing optimum photochromic properties, including relative temperature independence, in the inventive composition area involves a complex combination of relationships between the base glass composition and the photochromic elements, as well as among the several photochromic elements themselves.

For example, for a specific concentration of photochromic elements there is an optimum $R_2O:B_2O_3$ ratio and $(R_2O-Al_2O_3):B_2O_3$ ratio which yields the most favorable combination of photochromic properties. Thus, glasses containing more $R_2O$ darken to lower transmittance values, but fade more slowly. Conversely, glasses of lower $R_2O$ contents fade more rapidly but darken less. These phenomena are illustrated in the tables below.

Table III relates a number of batch compositions on the oxide basis in parts by weight, Table IIIA recites the base constituents therefor in cation percent, Table IIIB records the base components in mole percent along with the molar ratios $R_2O:B_2O_3$ and $(R_2O-Al_2O_3):B_2O_3$, and Table IIIC reports analyses of the photochromic elements as determined via X-ray fluorescence along with the weight ratio $Ag:(Cl+Br)$. Again, since the total of the base glass ingredients reported in Table III closely approximates 100, the amounts can for practical purposes be deemed to reflect weight percent. The batches were compounded, mixed, melted, and formed utilizing the method described above for the glasses of Table I. When pouring the melts into slabs, however, the slabs were maintained in the ambient environment for a brief period before being transferred to the annealer. This action was taken to insure that the temperature within the slab, when placed into the annealer, would not rise sufficiently to cause incipient heat treatment thereof.

TABLE III

| | 14 | 15 | 16 | 17 | 18 | 19 | 20 | 21 | 22 |
|---|---|---|---|---|---|---|---|---|---|
| $SiO_2$ | 62.8 | 62.7 | 62.7 | 62.7 | 62.7 | 62.7 | 62.7 | 62.7 | 62.7 |
| $B_2O_3$ | 16.2 | 16.5 | 16.9 | 17.3 | 16.5 | 16.9 | 17.3 | 17.6 | 16.9 |
| $Al_2O_3$ | 9.5 | 9.5 | 9.5 | 9.5 | 9.5 | 9.5 | 9.5 | 9.5 | 9.5 |
| $Na_2O$ | 3.8 | 3.5 | 3.2 | 2.9 | 3.5 | 3.2 | 2.9 | 2.6 | 3.2 |
| $Li_2O$ | 1.8 | 1.8 | 1.8 | 1.8 | 1.8 | 1.8 | 1.8 | 1.8 | 1.8 |
| $K_2O$ | 5.8 | 5.8 | 5.8 | 5.8 | 5.8 | 5.8 | 5.8 | 5.8 | 5.8 |
| CuO | 0.012 | 0.012 | 0.012 | 0.012 | 0.012 | 0.012 | 0.012 | 0.012 | 0.012 |
| Ag | 0.3 | 0.3 | 0.3 | 0.3 | 0.3 | 0.3 | 0.3 | 0.3 | 0.3 |
| Cl | 0.26 | 0.26 | 0.26 | 0.26 | 0.1 | 0.1 | 0.1 | 0.1 | 0.18 |
| Br | 0.2 | 0.2 | 0.2 | 0.2 | 0.2 | 0.2 | 0.2 | 0.2 | 0.2 |

TABLE IIIA

| | 14 | 15 | 16 | 17 | 18 | 19 | 20 | 21 | 22 |
|---|---|---|---|---|---|---|---|---|---|
| $SiO_2$ | 50.5 | 50.5 | 50.5 | 50.5 | 50.5 | 50.5 | 50.5 | 50.5 | 50.5 |
| $B_2O_3$ | 22.5 | 23 | 23.5 | 24 | 23 | 23.5 | 24 | 24.5 | 23.5 |
| $Al_2O_3$ | 9 | 9 | 9 | 9 | 9 | 9 | 9 | 9 | 9 |
| $Na_2O$ | 6 | 5.5 | 5 | 4.5 | 5.5 | 5 | 4.5 | 4 | 5 |
| $Li_2O$ | 6 | 6 | 6 | 6 | 6 | 6 | 6 | 6 | 6 |
| $K_2O$ | 6 | 6 | 6 | 6 | 6 | 6 | 6 | 6 | 6 |

TABLE IIB

| | 14 | 15 | 16 | 17 | 18 | 19 | 20 | 21 | 22 |
|---|---|---|---|---|---|---|---|---|---|
| $SiO_2$ | 67.1 | 67.1 | 67.1 | 67.1 | 67.1 | 67.1 | 67.1 | 67.1 | 67.1 |
| $B_2O_3$ | 15.0 | 15.3 | 15.6 | 16.0 | 15.3 | 15.6 | 16.0 | 16.3 | 15.6 |
| $Al_2O_3$ | 6.0 | 6.0 | 6.0 | 6.0 | 6.0 | 6.0 | 6.0 | 6.0 | 6.0 |
| $Na_2O$ | 4.0 | 3.6 | 3.3 | 3.0 | 3.6 | 3.3 | 3.0 | 2.7 | 3.3 |
| $Li_2O$ | 4.0 | 4.0 | 4.0 | 4.0 | 4.0 | 4.0 | 4.0 | 4.0 | 4.0 |
| $K_2O$ | 4.0 | 4.0 | 4.0 | 4.0 | 4.0 | 4.0 | 4.0 | 4.0 | 4.0 |
| $R_2O:B_2O_3$ | 0.80 | 0.76 | 0.72 | 0.69 | 0.76 | 0.72 | 0.69 | 0.66 | 0.72 |
| $(R_2O-Al_2O_3):B_2O_3$ | 0.4 | 0.37 | 0.34 | 0.31 | 0.37 | 0.34 | 0.31 | 0.29 | 0.34 |

TABLE IIIC

| | 14 | 15 | 16 | 17 | 18 | 19 | 20 | 21 | 22 |
|---|---|---|---|---|---|---|---|---|---|
| CuO | 0.009 | 0.010 | 0.010 | 0.010 | 0.009 | 0.009 | 0.009 | 0.009 | 0.010 |
| Ag | 0.170 | 0.171 | 0.174 | 0.173 | 0.191 | 0.195 | 0.195 | 0.189 | 0.190 |
| Cl | 0.171 | 0.170 | 0.155 | 0.158 | 0.067 | 0.067 | 0.066 | 0.071 | 0.116 |
| Br | 0.124 | 0.120 | 0.103 | 0.101 | 0.126 | 0.127 | 0.120 | 0.115 | 0.114 |
| Ag:(Cl + Br) | 0.58 | 0.59 | 0.67 | 0.67 | 0.99 | 1.005 | 1.05 | 1.02 | 0.83 |

Specimens of Examples 14–22 were heated to 660° C. and held at that temperature for 30 minutes and thereafter quickly cooled to room temperature. Table IIID lists the photochromic properties displayed by 2 mm thick ground and polished plates prepared from those specimens employing the solar simulator source of radiation at temperatures of 26° C., 37° C., and −18° C. The legends appearing in the table have the same significance as those in Table IC.

TABLE IIID

| | 14 | 15 | 16 | 17 | 18 | 19 | 20 | 21 | 22 |
|---|---|---|---|---|---|---|---|---|---|
| 26° C. Exposure | | | | | | | | | |
| $T_{D10}$ | 31 | 38 | 44 | 55 | 65 | 52 | 46 | 45 | 35 |
| $T_{F5}$ | 68 | 75 | 81 | 85 | 67 | 60 | 61 | 70 | 71 |
| $T_{F5} - T_{D10}$ | 37 | 37 | 37 | 30 | 2 | 8 | 15 | 25 | 36 |
| 37° C. Exposure | | | | | | | | | |
| | 14 | 15 | 16 | 17 | 18 | 19 | 20 | 21 | 22 |
| $T_{D10}$ | 47 | 54 | 59 | 67 | 67 | 56 | 50 | 55 | 48 |
| $T_{F5}$ | 78 | 83 | 86 | 89 | 70 | 69 | 72 | 79 | 81 |
| $T_{F5} - T_{D10}$ | 31 | 29 | 27 | 22 | 3 | 13 | 22 | 24 | 33 |
| −18° C. Exposure | | | | | | | | | |
| | 14 | 15 | 16 | 17 | 18 | 19 | 20 | 21 | 22 |
| $T_{D10}$ | 19 | 14 | 15 | 15 | 62 | 49 | 43 | 36 | 22 |

Examples 14–22 are illustrative of acceptable $R_2O:B_2O_3$ and $(R_2O-Al_2O_3):B_2O_3$ ratios. However, those compositions also indicate that, when the ratio of silver to halide is altered, it will be necessary to also change molar ratios $R_2O:B_2O_3$ and $(R_2O-Al_2O_3):B_2O_3$ to find the optimum composition area for photochromic properties. Thus, the examples demonstrate that, where the weight ratio Ag:halide is <0.7 or >0.95, photochromic behavior in compliance with the objectives of the present invention may not be attainable. However, altering the $(R_2O-Al_2O_3):B_2O_3$ ratio of the base composition may make it possible to achieve satisfactory photochromic behavior. Thus, Example 14 illustrates that even when the Ag:(Cl+Br) ratio is below 0.65, a high $(R_2O-Al_2O_3):B_2O_3$ ratio may enable suitable photochromic properties to be secured therein. Nevertheless, such a glass may not demonstrate optimum values with regard to other properties. Finally, Example 22 emphasizes this criticality of the ratio Ag:halide since that glass manifests better photochromic characteristics, including a lower temperature dependence, than do Examples 16 and 19 which have the same overall composition other than the halide content.

Example 23–26 reported in Table IV again illustrate that in the inventive glass composition field the weight ratio of Ag:halide will preferably be <0.95 in order to achieve satisfactory photochromic properties. Table IV recites the batch components on the oxide basis in parts by weight. Table IVA records the constituents of the base glass in cation percent, Table IVB lists the base glass ingredients in terms of mole percent along with the molar ratios $R_2O:B_2O_3$ and $(R_2O-Al_2O_3):B_2O_3$, and Table IVC reports analyses of the photochromic elements as measured through X-ray fluorescence along with the weight ratio Ag:(Cl+Br). Because the total of the base glass ingredients tabulated in Table IV closely approximates 100, for practical purposes the amount of each can be considered to be present as weight percent. The batches were compounded, mixed, melted, formed, and annealed in like manner to the method related above for the glasses of Table III.

TABLE IV

|  | 23 | 24 | 25 | 26 |
|---|---|---|---|---|
| $SiO_2$ | 62.7 | 62.7 | 62.7 | 62.7 |
| $B_2O_3$ | 16.5 | 16.9 | 17.3 | 17.6 |
| $Al_2O_3$ | 9.5 | 9.5 | 9.5 | 9.5 |
| $Na_2O$ | 3.5 | 3.2 | 2.9 | 2.6 |
| $Li_2O$ | 1.8 | 1.8 | 1.8 | 1.8 |
| $K_2O$ | 5.8 | 5.8 | 5.8 | 5.8 |
| CuO | 0.012 | 0.012 | 0.012 | 0.012 |
| Ag | 0.3 | 0.3 | 0.3 | 0.3 |
| Cl | 0.18 | 0.18 | 0.18 | 0.18 |
| Br | 0.1 | 0.1 | 0.1 | 0.1 |

TABLE IVA

|  | 23 | 24 | 25 | 26 |
|---|---|---|---|---|
| $SiO_2$ | 50.5 | 50.5 | 50.5 | 50.5 |
| $B_2O_3$ | 23 | 23.5 | 24 | 24.5 |
| $Al_2O_3$ | 9 | 9 | 9 | 9 |
| $Na_2O$ | 5.5 | 5 | 4.5 | 4 |
| $Li_2O$ | 6 | 6 | 6 | 6 |
| $K_2O$ | 6 | 6 | 6 | 6 |

TABLE IVB

|  | 23 | 24 | 25 | 26 |
|---|---|---|---|---|
| $SiO_2$ | 67.1 | 67.1 | 67.1 | 67.1 |
| $B_2O_3$ | 15.3 | 15.6 | 16.0 | 16.3 |
| $Al_2O_3$ | 6.0 | 6.0 | 6.0 | 6.0 |
| $Na_2O$ | 3.6 | 3.3 | 3.0 | 2.7 |
| $Li_2O$ | 4.0 | 4.0 | 4.0 | 4.0 |
| $K_2O$ | 4.0 | 4.0 | 4.0 | 4.0 |
| $R_2O:B_2O_3$ | 0.76 | 0.72 | 0.69 | 0.66 |
| $(R_2O-Al_2O_3):B_2O_3$ | 0.37 | 0.34 | 0.31 | 0.29 |

TABLE IVC

|  | 23 | 24 | 25 | 26 |
|---|---|---|---|---|
| CuO | 0.009 | 0.010 | 0.010 | 0.009 |
| Ag | 0.206 | 0.200 | 0.199 | 0.196 |
| Cl | 0.129 | 0.126 | 0.121 | 0.118 |
| Br | 0.070 | 0.064 | 0.063 | 0.061 |
| Ag: (Cl + Br) | 1.04 | 1.05 | 1.08 | 1.10 |

Specimens of Examples 23–26 were heated to 660° C., maintained thereat for 30 minutes, and then quickly cooled to room temperature. Table IVD records the photochromic properties exhibited in 2 mm thick ground and polished plates prepared from those specimens utilizing the solar simulator as the source of radiation. Exposures were made at 27° C., 40° C., and −18° C. The legends listed in the table have the same significance as those defined in Table IC.

TABLE IVD

| | 27° C. Exposure | | | |
|---|---|---|---|---|
|  | 23 | 24 | 25 | 26 |
| $T_{D10}$ | 53 | 48 | 39 | 42 |
| $T_{F5}$ | 57 | 56 | 67 | 74 |
| $T_{F5} - T_{D10}$ | 4 | 8 | 28 | 32 |
| | 40° C. Exposure | | | |
|  | 23 | 24 | 25 | 26 |
| $T_{D10}$ | 54 | 50 | 48 | 56 |
| $T_{F5}$ | 62 | 66 | 78 | 82 |
| $T_{F5} - T_{D10}$ | 8 | 16 | 30 | 26 |
| | −18° C. Exposure | | | |
|  | 23 | 24 | 25 | 26 |
| $T_{D10}$ | 52 | 47 | 32 | 29 |

A comparison of Examples 18–21 of Table III with Examples 23–26 shows a similarity in photochromic properties. It is apparent that varying the molar ratios $R_2O:B_2O_3$ will alter the properties of the glass but the objectives of the present invention may not be achieved where the weight ratio Ag:halide is >0.95, whether the predominant halide be Cl$^-$ or Br$^-$. Yet, Example 22 provided a glass with very good photochromic behavior, the Ag:halide weight ratio thereof being less than 0.95. This, again, illustrates the criticality of the silver and halide ranges to achieve acceptable photochromic characteristics.

The effect of varying the bromide content, while maintaining the remainder of the glass composition essentially constant, is demonstrated in Examples 27–29. Table V reports the batch ingredients on the oxide basis of the base glass in parts by weight and values for the photochromic elements, as analyzed by means of X-ray fluoroescence, along with the weight ratio Ag:(Cl+Br). Table VA recites the constituents of the base glass in cation percent, and Table VB records the base glass components in terms of mole percent, the molar ratio $R_2O:B_2O_3$ of each glass being approximately 0.72. Where $ZrO_2$ is present in the glass composition, a molar ratio of $(R_2O-Al_2O_3-ZrO_2):B_2O_3$ will be maintained within the range of 0.25–0.4 with the most optimum at levels of about 0.32–0.35. The molar ratio of $(R_2O-Al_2O_3-ZrO_2):B_2O_3$ in the base glass components of Examples 27-29 is about 0.33. Again, inasmuch as the total of the base glass ingredients listed in Table V closely approaches 100, the quantity of each constituent can reasonably be deemed to be included in terms of weight percent. The batches were compounded and blended together thoroughly in a ball mill to assist in achieved a homogeneous melt. Batches of about 40 pounds were melted in a laboratory scale continuous melting unit of approximately 80 pounds capacity. The melting unit is lined with platinum and has a pre-melt and a stirring/fining section. Melting temperatures ranged about 1375°–1400° C. The residence time of the molten batch within the unit is about 3–3.5 hours at a normal pull rate of 20 lbs/hour. About 20 curved lens blanks having a diameter of 65 mm were pressed in a graphite mold every 30 minutes for six hours to obtain the full range of the intended composition excursion. The lens blanks were transferred to an annealer operating at about 450° C.

TABLE V

|  | 27 | 28 | 29 |
|---|---|---|---|
| $SiO_2$ | 56.3 | 56.3 | 56.3 |
| $B_2O_3$ | 18.2 | 18.2 | 18.2 |
| $Al_2O_3$ | 6.2 | 6.2 | 6.2 |
| $Na_2O$ | 4.1 | 4.1 | 4.1 |
| $Li_2O$ | 1.8 | 1.8 | 1.8 |
| $K_2O$ | 5.7 | 5.7 | 5.7 |
| $ZrO_2$ | 5.0 | 5.0 | 5.0 |
| $TiO_2$ | 2.3 | 2.3 | 2.3 |
| CuO | 0.011 | 0.011 | 0.011 |
| Ag | 0.202 | 0.209 | 0.208 |
| Cl | 0.136 | 0.136 | 0.138 |
| Br | 0.084 | 0.128 | 0.141 |
| Ag:(Cl + Br) | 0.92 | 0.79 | 0.75 |

TABLE VA

|  | 27 | 28 | 29 |
|---|---|---|---|
| $SiO_2$ | 46.3 | 46.3 | 46.3 |
| $B_2O_3$ | 25.8 | 25.8 | 25.8 |
| $Al_2O_3$ | 6 | 6 | 6 |
| $Na_2O$ | 6.5 | 6.5 | 6.5 |
| $Li_2O$ | 6 | 6 | 6 |
| $K_2O$ | 6 | 6 | 6 |
| $ZrO_2$ | 2 | 2 | 2 |
| $TiO_2$ | 1 | 1 | 1 |

TABLE VB

|  | 27 | 28 | 29 |
|---|---|---|---|
| $SiO_2$ | 62.2 | 62.2 | 62.2 |
| $B_2O_3$ | 17.3 | 17.3 | 17.3 |
| $Al_2O_3$ | 4.0 | 4.0 | 4.0 |
| $Na_2O$ | 4.4 | 4.4 | 4.4 |
| $Li_2O$ | 4.0 | 4.0 | 4.0 |
| $K_2O$ | 4.0 | 4.0 | 4.0 |
| $ZrO_2$ | 2.7 | 2.7 | 2.7 |
| $TiO_2$ | 1.3 | 1.3 | 1.3 |

Samples of Examples 27-29 were heated in a laboratory furnace to 550° C., held at that temperature for 20 minutes, further heated to 660° C., maintained thereat for 30 minutes, cooled at 600° C./hour to 500° C., cooled at 200° C./hour to 450° C., and thereafter allowed to cool to room temperature overnight in the furnace. Table VC reports the photochromic behavior of 2 mm thick ground and polished plates prepared from those specimens employing the solar simulator as the source of radiation. Exposures were made at 26° C., 37° C., and −18° C. The legends recited in the table have the same meaning as defined with respect to Table IC.

TABLE VC

|  | 26° C. Exposure | | |
|---|---|---|---|
|  | 27 | 28 | 29 |
| $T_{D10}$ | 41 | 32 | 34 |
| $T_{F5}$ | 63 | 75 | 77 |
| $T_{F5} - T_{D10}$ | 22 | 43 | 43 |
|  | 37° C. Exposure | | |
|  | 27 | 28 | 29 |
| $T_{D10}$ | 46 | 46 | 50 |
| $T_{F5}$ | 78 | 83 | 85 |
| $T_{F5} - T_{D10}$ | 32 | 37 | 35 |
|  | −18° C. Exposure | | |
|  | 27 | 28 | 29 |
| $T_{D10}$ | 40 | 19 | 13 |

As can be seen from a study of the above tables, bromide contents less than about 0.1% by weight hazard an undesirable reduction in the darkening capability and in the fading rate exhibited by the glass. Nevertheless, care must be exercised in utilizing substantial quantities of bromide since, as evidenced in Example 29, the relative temperature independence of the glass can be adversely affected.

The consequences of varying the CuO content, while holding the remainder of the glass composition relatively constant, are manifested in a comparison of Examples 30-35 with Examples 2-4. The batch ingredients of the base glasses for Examples 30-35 are recorded in Table VI on the oxide basis in parts by weight and levels of the photochromic elements, as analyzed via X-ray fluorescence, are reported in weight percent along with the weight ratio Ag:(Cl+Br). Table VIA lists the components of the base glass in cation percent, and Table VIB reports the base glass constituents as expressed in mole percent, and includes the molar ratios $R_2O:B_2O_3$ and $(R_2O-Al_2O_3):B_2O_3$ of each glass. Again, since the sum of the base glass components recited in Table VI closely approaches 100, for practical purposes the amount of each constituent can be considered to be recorded in terms of weight percent. The batches were compounded, mixed, formed, and annealed following the process outlined above for the glasses of Table II.

TABLE VI

|  | 30 | 2 | 31 | 32 | 3 | 33 | 34 | 4 | 35 |
|---|---|---|---|---|---|---|---|---|---|
| $SiO_2$ | 62.7 | 62.74 | 62.7 | 62.7 | 62.71 | 62.7 | 62.7 | 62.69 | 62.7 |
| $B_2O_3$ | 16.5 | 16.55 | 16.5 | 16.9 | 16.91 | 16.9 | 17.3 | 17.26 | 17.3 |
| $Al_2O_3$ | 9.5 | 9.49 | 9.5 | 9.5 | 9.48 | 9.5 | 9.5 | 9.48 | 9.5 |
| $Na_2O$ | 3.5 | 3.52 | 3.5 | 3.2 | 3.20 | 3.2 | 2.9 | 2.88 | 2.9 |
| $Li_2O$ | 1.8 | 1.85 | 1.8 | 1.8 | 1.85 | 1.8 | 1.8 | 1.85 | 1.8 |
| $K_2O$ | 5.8 | 5.84 | 5.8 | 5.8 | 5.84 | 5.8 | 5.8 | 5.84 | 5.8 |
| CuO | 0.004 | 0.009 | 0.013 | 0.003 | 0.009 | 0.012 | 0.004 | 0.010 | 0.013 |
| Ag | 0.187 | 0.193 | 0.184 | 0.188 | 0.187 | 0.189 | 0.194 | 0.184 | 0.189 |
| Cl | 0.119 | 0.126 | 0.113 | 0.108 | 0.111 | 0.115 | 0.116 | 0.119 | 0.104 |
| Br | 0.117 | 0.108 | 0.117 | 0.117 | 0.104 | 0.117 | 0.117 | 0.102 | 0.117 |
| Ag:(Cl + Br) | 0.79 | 0.82 | 0.84 | 0.84 | 0.87 | 0.81 | 0.83 | 0.83 | 0.86 |

TABLE VIA

|              | 30   | 2    | 31   | 32   | 3    | 33   | 34   | 4    | 35   |
|--------------|------|------|------|------|------|------|------|------|------|
| $SiO_2$      | 50.5 | 50.5 | 50.5 | 50.5 | 50.5 | 50.5 | 50.5 | 50.5 | 50.5 |
| $B_2O_3$     | 23.0 | 23.0 | 23.0 | 23.5 | 23.5 | 23.5 | 24.0 | 24.0 | 24.0 |
| $Al_2O_3$    | 9.0  | 9.0  | 9.0  | 9.0  | 9.0  | 9.0  | 9.0  | 9.0  | 9.0  |
| $Na_2O$      | 5.5  | 5.5  | 5.5  | 5.0  | 5.0  | 5.0  | 4.5  | 4.5  | 4.5  |
| $Li_2O$      | 6.0  | 6.0  | 6.0  | 6.0  | 6.0  | 6.0  | 6.0  | 6.0  | 6.0  |
| $K_2O$       | 6.0  | 6.0  | 6.0  | 6.0  | 6.0  | 6.0  | 6.0  | 6.0  | 6.0  |

TABLE VIB

|                           | 30   | 2    | 31   | 32   | 3    | 33   | 34   | 4    | 35   |
|---------------------------|------|------|------|------|------|------|------|------|------|
| $SiO_2$                   | 67.1 | 67.1 | 67.1 | 67.1 | 67.1 | 67.1 | 67.1 | 67.1 | 67.1 |
| $B_2O_3$                  | 15.3 | 15.3 | 15.3 | 15.6 | 15.6 | 15.6 | 15.9 | 15.9 | 15.9 |
| $Al_2O_3$                 | 6.0  | 6.0  | 6.0  | 6.0  | 6.0  | 6.0  | 6.0  | 6.0  | 6.0  |
| $Na_2O$                   | 3.6  | 3.6  | 3.6  | 3.3  | 3.3  | 3.3  | 3.0  | 3.0  | 3.0  |
| $Li_2O$                   | 4.0  | 4.0  | 4.0  | 4.0  | 4.0  | 4.0  | 4.0  | 4.0  | 4.0  |
| $K_2O$                    | 4.0  | 4.0  | 4.0  | 4.0  | 4.0  | 4.0  | 4.0  | 4.0  | 4.0  |
| $R_2O:B_2O_3$             | 0.76 | 0.76 | 0.76 | 0.72 | 0.72 | 0.72 | 0.69 | 0.69 | 0.69 |
| $(R_2O-Al_2O_3):B_2O_3$   | 0.37 | 0.37 | 0.37 | 0.34 | 0.34 | 0.34 | 0.33 | 0.33 | 0.33 |

Specimens of Examples 30–35 and 2–4 were heated to 660° C., maintained at that temperature for 30 minutes, and thereafter cooled to room temperature. Table VIC delineates the photochromic properties of 2 mm thick ground and polished plates prepared from those specimens wherein the solar simulator is utilized as the source of radiation. Exposures were made at 26° C., 37° C., and −18° C. The legends accompanying the table have the same significance as set forth in Table IC. The data for Examples 2–4 are taken from Table ID.

TABLE VIC

26° C. Exposure

|                    | 30 | 2  | 31 | 32 | 3  | 33 | 34 | 4  | 35 |
|--------------------|----|----|----|----|----|----|----|----|----|
| $T_{D10}$          | 54 | 45 | 36 | 38 | 42 | 44 | 40 | 50 | 51 |
| $T_{F5}$           | 64 | 64 | 68 | 77 | 72 | 80 | 80 | 83 | 82 |
| $T_{F5} - T_{D10}$ | 10 | 19 | 32 | 39 | 30 | 36 | 40 | 33 | 31 |

37° C. Exposure

|                    | 30 | 2  | 31 | 32 | 3  | 33 | 34 | 4  | 35 |
|--------------------|----|----|----|----|----|----|----|----|----|
| $T_{D10}$          | 56 | 51 | 49 | 48 | 52 | 61 | 53 | 64 | 64 |
| $T_{F5}$           | 74 | 75 | 79 | 86 | 81 | 87 | 86 | 84 | 87 |
| $T_{F5} - T_{D10}$ | 18 | 24 | 20 | 28 | 29 | 26 | 33 | 24 | 23 |

−18° C. Exposure

|           | 30 | 2  | 31 | 32 | 3  | 33 | 34 | 4  | 35 |
|-----------|----|----|----|----|----|----|----|----|----|
| $T_{D10}$ | 54 | 44 | 29 | 34 | 32 | 16 | 32 | 23 | 17 |

It appears that an increase in CuO content hazards a reduction in the darkening capability of a glass at room temperature and higher, while increasing darkening at low temperatures. Both of those trends appear to be enhanced as the content of alkali metal oxide is decreased. Hence, the relative temperature independence of the glass may be deleteriously affected. These actions of CuO again emphasize the need to exercise caution in preparing glass compositions which will demonstrate photochromic properties satisfying the objectives of the invention. Finally, a study of the above tables indicates the interplay of the photochromic elements with the base glass composition and among the photochromic elements, themselves. Thus, even within the narrow overall limits of the photochromic elements operable in the inventive glasses, there are constraints which will preferably be observed to achieve the most optimum properties. For example, when the molar ratio of $(R_2O-Al_2O_3):B_2O_3$ or the molar ratio of $(R_2O-Al_2O_3-ZrO_2):B_2O_3$ is about 0.33–0.35 and, if the weight ratio of Ag:(Cl+Br) is in the lower portion of the range, then the CuO concentration will most preferably be in the lower half of its range of values.

The presence of alkali metal oxide in the base glass composition has been found to be vital for achieving the objectives of the instant invention. Nevertheless, whereas the preceding exemplary compositions contained $Li_2O+Na_2O+K_2O$, that combination is not necessary as can be seen from Examples 36 and 37.

Table VII lists the ingredients of Examples 36 and 37 on the oxide basis in parts by weight, Table VIIA reports the components of the base glass in cation percent, and Table VIIB records the base glass constituents in terms of mole percent along with the molar ratios $R_2O:B_2O_3$ and $(R_2O-Al_2O_3):B_2O_3$ of each glass. Again, because the sum of the ingredients recited in Table VII closely approximates 100, it is reasonable to consider that the individual components are reported as weight percent. The batches were compounded, mixed, formed, and annealed in accordance with the method described above with respect to the glasses of Table III.

TABLE VII

|           | 36    | 37    |
|-----------|-------|-------|
| $SiO_2$   | 56.4  | 58.8  |
| $B_2O_3$  | 21.0  | 15.7  |
| $Al_2O_3$ | 9.6   | 9.0   |
| $Na_2O$   | 7.1   | —     |
| $K_2O$    | 5.9   | 16.6  |
| CuO       | 0.012 | 0.012 |
| Ag        | 0.3   | 0.28  |
| Cl        | 0.2   | 0.18  |
| Br        | 0.18  | 0.17  |

TABLE VIIA

|           | 36 | 37 |
|-----------|----|----|
| $SiO_2$   | 45 | 50 |
| $B_2O_3$  | 29 | 23 |
| $Al_2O_3$ | 9  | 9  |
| $Na_2O$   | 11 | —  |
| $K_2O$    | 6  | 18 |

TABLE VIIB

|           | 36   | 37   |
|-----------|------|------|
| $SiO_2$   | 62.1 | 66.7 |
| $B_2O_3$  | 20.0 | 15.3 |
| $Al_2O_3$ | 6.2  | 6.0  |

TABLE VIIB-continued

|  | 36 | 37 |
|---|---|---|
| $Na_2O$ | 7.6 | — |
| $K_2O$ | 4.1 | 12.0 |
| $R_2O:B_2O_3$ | 0.58 | 0.78 |
| $(R_2O-Al_2O_3):B_2O_3$ | 0.28 | 0.39 |

Specimens of Example 36 were heated to 700° C. and maintained thereat for 30 minutes. Specimens of Example 37 were heated to 660° C., held at that temperature for 30 minutes, cooled to room temperature and then reheated at 425° C. for 16 hours and thereafter cooled to room temperature. Table VIIC sets out the photochromic properties displayed by 2 mm thick ground and polished plates prepared from the specimens of Examples 36 and 37 employing the solar simulator as the source of radiation. The samples were exposed at 27° C., 37° C., and −18° C. The legend appearing on the table have the same definition as recited with regard to Table IC.

TABLE VIIC

| 27° C. Exposure | | |
|---|---|---|
|  | 36 | 37 |
| $T_{D10}$ | 35 | 28 |
| $T_{F5}$ | 68 | 59 |
| $T_{F5} - T_{D10}$ | 33 | 31 |
| 37° C. Exposure | | |
|  | 36 | 37 |
| $T_{D10}$ | 44 | 38 |
| $T_{F5}$ | 79 | 72 |
| $T_{F5} - T_{D10}$ | 25 | 34 |
| −18° C. Exposure | | |
|  | 36 | 37 |
| $T_{D10}$ | 29 | 20 |

Table VIIC clearly points up the fact that glasses exhibiting photochromic characteristics satisfying the objectives of the present invention can be produced from compositions containing only $K_2O$ as the alkali metal oxide. Experience has demonstrated that at least 8% by weight of alkali metal oxide selected from the group of 0–2.5% $Li_2O$, 0–9% $Na_2O$, 0–17% $K_2O$, and 0–6% $Cs_2O$ must be included in the glass composition. Because of the practical need for suitable melting and forming behavior, as well as to achieve desired physical properties and chemical durability in the glass, the individual alkali metal oxides will be included in the cited ranges. Moreover, the most favorable combination of these factors is customarily secured where two and, preferably, three alkali metal oxides are used together.

Where the photochromic glass is to be used for prescription ophthalmic lenses, metal oxides such as $ZrO_2$, $Nb_2O_5$, $TiO_2$, BaO, $La_2O_3$, and MgO will be included in the glass composition to adjust the refractive index to 1.523 or higher. To maintain the desired photochromic properties, however, changes in the alkali metal oxide content and/or other components of the base glass may be required.

Table VIII lists several batch compositions in parts by weight, Table VIIIA records the base components therefor in cation percent, and Table VIIIB reports the base components therefor in mole percent, as well as the molar ratios $R_2O:B_2O_3$ and $(R_2O-Al_2O_3-ZrO_2-Nb_2O_5):B_2O_3$, which demonstrate that practice. The batches were compounded, mixed, melted, formed, and annealed in the same manner as those described in Table I.

TABLE VIII

|  | 38 | 39 | 40 | 41 | 42 | 43 |
|---|---|---|---|---|---|---|
| $SiO_2$ | 59.03 | 57.97 | 57.83 | 56.66 | 56.68 | 61.60 |
| $Al_2O_3$ | 9.69 | 9.52 | 9.50 | 9.30 | 9.31 | 9.31 |
| $B_2O_3$ | 19.49 | 18.06 | 18.37 | 17.65 | 17.30 | 17.66 |
| $Li_2O$ | 1.89 | 1.89 | 1.86 | 1.82 | 1.82 | 1.82 |
| $Na_2O$ | 3.93 | 4.18 | 3.85 | 3.46 | 3.77 | 3.14 |
| $K_2O$ | 5.97 | 5.86 | 5.85 | 5.73 | 5.73 | 3.35 |
| CuO | 0.012 | 0.012 | 0.012 | 0.012 | 0.012 | 0.012 |
| Ag | 0.3 | 0.3 | 0.3 | 0.3 | 0.3 | 0.3 |
| Cl | 0.18 | 0.18 | 0.18 | 0.18 | 0.18 | 0.18 |
| Br | 0.2 | 0.2 | 0.2 | 0.2 | 0.2 | 0.2 |
| $ZrO_2$ | — | 2.56 | — | — | — | — |
| $Nb_2O_5$ | — | — | 2.75 | 5.39 | 5.39 | — |
| BaO | — | — | — | — | — | 3.11 |

TABLE VIIIA

|  | 38 | 39 | 40 | 41 | 42 | 43 |
|---|---|---|---|---|---|---|
| $SiO_2$ | 46.5 | 46.5 | 46.5 | 46.5 | 46.5 | 50.5 |
| $Al_2O_3$ | 9.0 | 9.0 | 9.0 | 9.0 | 9.0 | 9.0 |
| $B_2O_3$ | 26.5 | 25.0 | 25.5 | 25.0 | 24.5 | 25.0 |
| $Li_2O$ | 6.0 | 6.0 | 6.0 | 6.0 | 6.0 | 6.0 |
| $Na_2O$ | 6.0 | 6.5 | 6.0 | 5.5 | 6.0 | 5.0 |
| $K_2O$ | 6.0 | 6.0 | 6.0 | 6.0 | 6.0 | 3.5 |
| $ZrO_2$ | — | 1.0 | — | — | — | — |
| $Nb_2O_5$ | — | — | 1.0 | 2.0 | 2.0 | — |
| BaO | — | — | — | — | — | 1.0 |

TABLE VIIIB

|  | 38 | 39 | 40 | 41 | 42 | 43 |
|---|---|---|---|---|---|---|
| $SiO_2$ | 63.5 | 63.5 | 63.5 | 63.5 | 63.5 | 66.7 |
| $Al_2O_3$ | 6.1 | 6.1 | 6.1 | 6.1 | 6.1 | 5.9 |
| $B_2O_3$ | 18.1 | 16.9 | 17.4 | 17.1 | 16.7 | 16.5 |
| $Li_2O$ | 4.1 | 4.1 | 4.1 | 4.1 | 4.1 | 4.0 |
| $Na_2O$ | 4.1 | 4.4 | 4.1 | 3.7 | 4.1 | 3.3 |
| $K_2O$ | 4.1 | 4.1 | 4.1 | 4.1 | 4.1 | 2.3 |
| $ZrO_2$ | — | 1.4 | — | — | — | — |
| $Nb_2O_5$ | — | — | 0.7 | 1.4 | 1.4 | — |
| BaO | — | — | — | — | — | 1.3 |
| $R_2O:B_2O_3$ | 0.68 | 0.74 | 0.71 | 0.70 | 0.73 | 0.58 |
| $(R_2O-Al_2O_3-Nb_2O_5-ZrO_2):B_2O_3$ | 0.34 | 0.38 | 0.36 | 0.34 | 0.37 | 0.22 |

The glass patties of Table VIII were subjected to a two-step heat treatment to develop photochromic behavior, this treatment consisting of heating to 550° C., holding at that temperature for 30 minutes, then heating to 650° C. maintaining that temperature for 45 minutes, and thereafter quickly cooling to room temperature. Table VIIIC lists the photochromic properties demonstrated in 2 mm thick ground and polished plates of Examples 38–43 of Table VIII employing exposures from the solar simulator darkening source at temperatures of about 26° and 38° C. The legends of Table VIIIC have the same significance as those recited in Table IC.

TABLE VIIIC

| 26° C. Exposure Temperature | 38 | 39 | 40 | 41 | 42 | 43 |
|---|---|---|---|---|---|---|
| $T_{D10}$ | 39% | 39% | 38% | 47% | 36% | 46% |
| $T_{F5}$ | 70% | 70% | 75% | 83% | 71% | 77% |
| $T_{F5} - T_{D10}$ | 35% | 31% | 37% | 36% | 35% | 31% |
| 38° C. Exposure Temperature | 38 | 39 | 40 | 41 | 42 | 43 |
| $T_{D10}$ | 52% | 50% | 52% | 61% | 48% | 58% |
| $T_{F5}$ | 81% | 79% | 84% | 87% | 81% | 83% |
| $T_{F5} - T_{D10}$ | 29% | 29% | 32% | 26% | 33% | 25% |

A study of Table VIIIA in conjunction with Table VIIIC points up the fact that the level of photochromic behavior in $ZrO_2$-containing glasses can generally be maintained via an increase in alkali metal oxide content with an accompanying decrease in $B_2O_3$. In $Nb_2O_5$-containing glasses, photochromic characteristics can be held relatively constant by reducing the $B_2O_3$ content. A comparison of the $Nb_2O_5$-containing glasses, Examples 41 and 42, illustrates that a slight decrease in alkali metal content can be deleterious to the darkening behavior of the glass thereby requiring other changes in composition, e.g., the photochromic elements, to attain the desired properties. Where BaO is included in the composition, a decrease in alkali metal oxide content accompanied with an increase in $B_2O_3$ level will serve to hold the photochromic behavior at desired values.

A comparison of Example 3 with Example 38 indicates that an increase in $SiO_2$ content can be offset through a decrease in alkali metal oxide content and $B_2O_3$, this reduction involving, on a cation basis, about one alkali metal oxide and three $B_2O_3$ for an increase of four cation percent $SiO_2$.

The use of $ZrO_2$ and/or $TiO_2$ to adjust the refractive index of the glass has been found quite desirable and these components are much preferred to BaO or PbO which have conventionally been utilized in the ophthalmic art to vary the refractive index of glasses. Thus, BaO appears to adversely affect the darkening capability of the glass and PbO seems to decrease the rate of fading exhibited by these glasses. Furthermore, the incorporation of $ZrO_2$ and/or $TiO_2$ into the glass composition serves to improve the chemical durability thereof and to enhance the mechanical strength of the glass upon being subjected to a chemical strengthening process. However, uncontrolled additions of these ingredients can lead to undesirable side effects. For example, the inclusion of $ZrO_2$ tends to raise the liquidus temperature of the glass and to increase the danger of devitrification. Excessive levels of $TiO_2$ give rise to a yellow coloration in the glass and hazard the development of opalization therein.

Table IX recites several batch compositions on the oxide basis containing $ZrO_2$ in parts by weight, Table IXA records the base glass components therefor in cation percent, and Table IXB lists the base glass components in mole percent as well as the molar ratios $R_2O:B_2O_3$ and $(R_2O\text{-}Al_2O_3\text{-}ZrO_2):B_2O_3$. Again, because the total of the base glass ingredients set forth in Table IX closely approximates 100, the figures can reasonably be deemed to represent weight percent. The batches were compounded, mixed, melted, formed, and annealed in like manner to that described in Table III. Example 3 is included in Table IX merely for comparison purposes.

TABLE IX

|  | 3 | 44 | 45 | 46 | 47 | 48 | 49 | 50 | 51 |
|---|---|---|---|---|---|---|---|---|---|
| $SiO_2$ | 62.61 | 62.28 | 62.28 | 62.28 | 62.28 | 62.28 | 62.28 | 62.28 | 62.28 |
| $B_2O_3$ | 16.91 | 16.79 | 16.79 | 16.79 | 16.79 | 16.79 | 16.79 | 16.79 | 16.79 |
| $Al_2O_3$ | 9.48 | 9.25 | 8.25 | 7.75 | 5.15 | 8.1 | 7.12 | 6.12 | 4.14 |
| $Na_2O$ | 3.20 | 2.5 | 3.14 | 3.46 | 3.76 | 2.46 | 3.09 | 3.72 | 4.4 |
| $Li_2O$ | 1.85 | 1.84 | 1.84 | 1.84 | 1.84 | 1.84 | 1.84 | 1.84 | 1.84 |
| $K_2O$ | 5.84 | 5.80 | 5.80 | 5.80 | 5.80 | 5.80 | 5.80 | 5.80 | 5.80 |
| $ZrO_2$ | — | 2.48 | 2.49 | 2.49 | 2.51 | 4.87 | 4.89 | 4.91 | 4.98 |
| CuO | 0.012 | 0.012 | 0.012 | 0.012 | 0.012 | 0.012 | 0.012 | 0.012 | 0.012 |
| Ag | 0.3 | 0.3 | 0.3 | 0.3 | 0.3 | 0.3 | 0.3 | 0.3 | 0.3 |
| Cl | 0.18 | 0.18 | 0.18 | 0.18 | 0.18 | 0.18 | 0.18 | 0.18 | 0.18 |
| Br | 0.2 | 0.2 | 0.2 | 0.2 | 0.2 | 0.2 | 0.2 | 0.2 | 0.2 |

TABLE IXA

|  | 3 | 44 | 45 | 46 | 47 | 48 | 49 | 50 | 51 |
|---|---|---|---|---|---|---|---|---|---|
| $SiO_2$ | 50.5 | 50.5 | 50.5 | 50.5 | 50.5 | 50.5 | 50.5 | 50.5 | 50.5 |
| $B_2O_3$ | 23.5 | 23.5 | 23.5 | 23.5 | 23.5 | 23.5 | 23.5 | 23.5 | 23.5 |
| $Al_2O_3$ | 9 | 9 | 8 | 7.5 | 6.5 | 8 | 7 | 6 | 5 |
| $Na_2O$ | 5 | 4 | 5 | 5.5 | 6.5 | 4 | 5 | 6 | 7 |
| $Li_2O$ | 6 | 6 | 6 | 6 | 6 | 6 | 6 | 6 | 6 |
| $K_2O$ | 6 | 6 | 6 | 6 | 6 | 6 | 6 | 6 | 6 |
| $ZrO_2$ | 0 | 1 | 1 | 1 | 1 | 2 | 2 | 2 | 2 |

TABLE IXB

|  | 3 | 44 | 45 | 46 | 47 | 48 | 49 | 50 | 51 |
|---|---|---|---|---|---|---|---|---|---|
| $SiO_2$ | 67.1 | 66.7 | 66.7 | 66.7 | 66.7 | 66.2 | 66.2 | 66.2 | 66.2 |
| $B_2O_3$ | 15.6 | 15.5 | 15.5 | 15.5 | 15.5 | 15.4 | 15.4 | 15.4 | 15.4 |
| $Al_2O_3$ | 6.0 | 5.9 | 5.3 | 5.0 | 4.3 | 5.25 | 4.6 | 3.9 | 3.3 |
| $Na_2O$ | 3.3 | 2.6 | 3.3 | 3.6 | 4.3 | 2.6 | 3.3 | 3.9 | 4.6 |
| $Li_2O$ | 4.0 | 4.0 | 4.0 | 4.0 | 4.0 | 3.9 | 3.9 | 3.9 | 3.9 |
| $K_2O$ | 4.0 | 4.0 | 4.0 | 4.0 | 4.0 | 3.9 | 3.9 | 3.9 | 3.9 |
| $ZrO_2$ | — | 1.3 | 1.3 | 1.3 | 1.3 | 2.6 | 2.6 | 2.6 | 2.6 |
| $R_2O:B_2O_3$ | 0.72 | 0.68 | 0.73 | 0.75 | 0.79 | 0.68 | 0.72 | 0.76 | 0.81 |
| $(R_2O\text{-}Al_2O_3\text{-}ZrO_2):B_2O_3$ | 0.34 | 0.22 | 0.30 | 0.34 | 0.43 | 0.17 | 0.25 | 0.34 | 0.38 |

The glass slabs of Table IX were exposed to a two-step heat treatment to induce photochromic behavior, viz., heating to 560° C., holding that temperature for about 30 minutes, raising the temperature to 675° C., maintaining thereat for 30 minutes, and then quickly cooling to room temperature. Table IXC reports the photochromic characteristics exhibited by 2 mm thick ground and polished plates of Examples 44–51 involving the solar simulator darkening source at a temperature of 27° C., 38° C., and −18° C. The legends of Table IXC have the same meaning as those recorded in Table IC. ($T_{D20}$ signifies the darkened transmittance of the glass after an exposure of 20 minutes.) The data for Example 3 are taken from Table IC.

TABLE IXC

| 27° C. Exposure | | | | | | | | | |
|---|---|---|---|---|---|---|---|---|---|
|  | 3 | 44 | 45 | 46 | 47 | 48 | 49 | 50 | 51 |
| $T_{D10}$ | 38 | 78 | 53 | 38 | 27 | 76 | 59 | 35 | 45 |
| $T_{F5}$ | 76 | 92 | 85 | 80 | 52 | 91 | 89 | 74 | 49 |
| $T_{F5} - T_{D10}$ | 38 | 14 | 32 | 42 | 25 | 15 | 30 | 39 | 4 |
| 38° C. Exposure | | | | | | | | | |
|  | 3 | 44 | 45 | 46 | 47 | 48 | 49 | 50 | 51 |
| $T_{D10}$ | 53 | 84 | 66 | 53 | 34 | 84 | 73 | 46 | 47 |
| $T_{F5}$ | 83 | 91 | 88 | 85 | 65 | 91 | 91 | 83 | 55 |
| $T_{F5} - T_{D10}$ | 30 | 7 | 22 | 32 | 31 | 7 | 18 | 37 | 8 |
| −18° C. Exposure | | | | | | | | | |
|  | 3 | 44 | 45 | 46 | 47 | 48 | 49 | 50 | 51 |
| $T_{D20}$ | 24 | — | — | 21 | — | — | — | 28 | — |

The above exemplary compositions illustrate the capability inherent in the inventive glasses of achieving the desired photochromic performance, including relative temperature independence, via readjustment of the base glass. Hence, as can readily be seen from Examples 3, 46, and 50, when the $Al_2O_3$ level is lowered and balanced with an increase in $Na_2O$ content, the photochromic properties are maintained as $ZrO_2$ is added. Other types of substitutions appear to exert a deleterious effect. The changes observed in the photochromic behavior are similar to the modifications noted in Examples 38 and 39 of Table VIII where the $R_2O:B_2O_3$ ratio was altered. The simultaneous removal of $Al_2O_3$ and increase in $Na_2O$ content is preferred because it improves the melting qualities of the glass, thereby imparting a practical advantage to that substitution.

Nevertheless, as was cited previously, the inclusion of $ZrO_2$ tends to raise the liquidus of the glass and/or reduce the viscosity thereof at the liquidus temperature. An increase in refractive index of about 0.003 has been observed for each weight percent of $ZrO_2$ added. For large scale commercial melting conditions, a 5% by weight addition of $ZrO_2$ is about the practical limit because of melting and forming problems. That amount (~2 cation %) is sufficient to raise the index of Example 3 from 1.497 to 1.503 in Example 46 and to 1.511 in Example 50.

Table X lists several batch compositions on the oxide basis containing $TiO_2$ with and without $ZrO_2$ in parts by weight along with the refractive indices ($n_D$) thereof, Table XA records the base components therefor in cation percent, and Table XB reports the base components in mole percent as well as the molar ratios $R_2O:B_2O_3$ and $(R_2O-Al_2O_3-ZrO_2):B_2O_3$. Again, inasmuch as the total of the base glass components set forth in Table X closely approaches 100, the values recited of the individual ingredients can reasonably be considered to represent weight percent. The batches were compounded, mixed, melted, formed, and annealed in accordance with the practice described above for the glasses of Table III. Example 3 is included in Table X merely for comparison purposes.

TABLE X

|  | 3 | 52 | 53 | 54 | 55 | 56 | 57 | 58 |
|---|---|---|---|---|---|---|---|---|
| $SiO_2$ | 62.71 | 61.7 | 61.49 | 60.03 | 59.24 | 59.74 | 58.83 | 57.86 |
| $B_2O_3$ | 16.91 | 15.93 | 16.58 | 16.79 | 15.92 | 16.70 | 16.24 | |
| $Al_2O_3$ | 9.48 | 9.33 | 7.75 | 6.72 | 6.12 | 6.08 | 6.11 | 6.07 |
| $Na_2O$ | 3.20 | 3.15 | 3.46 | 3.44 | 3.72 | 3.70 | 3.72 | 3.69 |
| $Li_2O$ | 1.85 | 1.82 | 1.82 | 1.84 | 1.80 | 1.78 | 1.79 | 1.78 |
| $K_2O$ | 5.84 | 5.75 | 5.73 | 5.80 | 5.66 | 5.62 | 5.65 | 5.61 |
| $TiO_2$ | — | 1.62 | — | 1.48 | 1.59 | 1.58 | 1.59 | 3.17 |
| $ZrO_2$ | — | — | 2.49 | 2.51 | 4.93 | 4.90 | 4.92 | 4.89 |
| CuO | 0.012 | 0.012 | 0.012 | 0.012 | 0.012 | 0.012 | 0.012 | 0.012 |
| Ag | 0.3 | 0.3 | 0.3 | 0.3 | 0.3 | 0.3 | 0.3 | 0.3 |
| Cl | 0.18 | 0.18 | 0.18 | 0.18 | 0.18 | 0.18 | 0.18 | 0.18 |
| Br | 0.2 | 0.2 | 0.2 | 0.2 | 0.2 | 0.2 | 0.2 | 0.2 |
| $n_D$ | 1.497 | 1.503 | 1.504 | 1.510 | 1.520 | 1.520 | 1.520 | 1.528 |

TABLE XA

|  | 3 | 52 | 53 | 54 | 55 | 56 | 57 | 58 |
|---|---|---|---|---|---|---|---|---|
| $SiO_2$ | 50.5 | 50.5 | 50.5 | 49.5 | 49.5 | 50 | 49 | 48.5 |
| $B_2O_3$ | 23.5 | 22.5 | 23.5 | 23.5 | 23.5 | 23 | 24 | 23.5 |
| $Al_2O_3$ | 9 | 9.0 | 7.5 | 7.5 | 6 | 6 | 6 | 6 |
| $Na_2O$ | 5 | 5 | 5.5 | 5.5 | 6 | 6 | 6 | 6 |
| $Li_2O$ | 6 | 6 | 6 | 6 | 6 | 6 | 6 | 6 |
| $K_2O$ | 6 | 6 | 6 | 6 | 6 | 6 | 6 | 6 |
| $TiO_2$ | — | 1 | — | 1 | 1 | 1 | 1 | 1 |
| $ZrO_2$ | — | — | 1 | 2 | 2 | 2 | 2 | 2 |

TABLE XB

|  | 3 | 52 | 53 | 54 | 55 | 56 | 57 | 58 |
|---|---|---|---|---|---|---|---|---|
| $SiO_2$ | 67.1 | 66.7 | 66.7 | 65.8 | 64.5 | 65.4 | 68.5 | 63.6 |
| $B_2O_3$ | 15.6 | 14.8 | 15.5 | 15.6 | 15.4 | 15.0 | 15.8 | 15.4 |
| $Al_2O_3$ | 6.0 | 5.9 | 5.0 | 5.0 | 3.9 | 3.9 | 3.9 | 3.9 |
| $Na_2O$ | 3.3 | 3.3 | 3.6 | 3.0 | 3.9 | 3.9 | 3.9 | 3.9 |
| $Li_2O$ | 4.0 | 4.0 | 4.0 | 4.0 | 3.9 | 3.9 | 3.9 | 3.9 |
| $K_2O$ | 4.0 | 4.0 | 4.0 | 4.0 | 3.9 | 3.9 | 3.9 | 3.9 |
| $TiO_2$ | — | 1.3 | — | 1.3 | 1.3 | 1.3 | 1.3 | 1.3 |
| $ZrO_2$ | — | — | 1.3 | 1.3 | 2.6 | 2.6 | 2.6 | 2.6 |
| $R_2O:B_2O_3$ | 0.72 | 0.76 | 0.75 | 0.7 | 0.76 | 0.78 | 0.74 | 0.76 |
| $(R_2O-Al_2O_3-ZrO_2):B_2O_3$ | 0.34 | 0.36 | 0.34 | 0.30 | 0.34 | 0.35 | 0.33 | 0.34 |

The glass specimens of Table X were subjected to a two-step heat treatment to develop photochromic characteristics, viz., heating to 575° C., maintaining that temperature for about 30 minutes, raising the temperature to 675° C., and holding thereat for about 30 minutes. Table XC recites the photochromic properties demonstrated by 2 mm thick ground and polished plates of Examples 52-58 utilizing the solar simulator darkening source at a temperature of 27° C. and 38° C. The legends of Table XC have the same meaning as those recorded in Table IC. The data for Example 3 are taken from Table IC.

TABLE XC

| | \multicolumn{7}{c}{27° C. Exposure} |
|---|---|---|---|---|---|---|---|
| | 3 | 52 | 53 | 54 | 55 | 56 | 57 | 58 |
| $T_{D10}$ | 38 | 40 | 43 | 43 | 37 | 36 | 37 | Opal |
| $T_{F5}$ | 76 | 75 | 78 | 77 | 71 | 71 | 72 | Opal |
| $T_{F5} - T_{D10}$ | 38 | 35 | 35 | 34 | 34 | 35 | 35 | Opal |
| | \multicolumn{7}{c}{38° C. Exposure} |
| | 3 | 52 | 53 | 54 | 55 | 56 | 57 | 58 |
| $T_{D10}$ | 53 | 54 | 57 | 56 | 51 | 49 | 52 | Opal |
| $T_{F5}$ | 83 | 82 | 84 | 82 | 80 | 79 | 80 | Opal |
| $T_{F5} - T_{D10}$ | 30 | 28 | 27 | 26 | 29 | 30 | 28 | Opal |

As is evident from comparing Example 3 with Example 52 and Example 53 with Example 54, in the inventive glass system $TiO_2$ can be substituted on a mole basis with equal success for $SiO_2$ and/or $B_2O_3$ but, unlike $ZrO_2$, can be substituted with no adjustment of the $R_2O:B_2O_3$ ratio. Thus, $TiO_2$ is an effective index-correcting oxide which, like $ZrO_2$, does not appear to exert any adverse effect upon the photochromic behavior of the base glass, including relative temperature independence. The effect upon refractive index appears to be about 30 0.005 for each weight percent of $TiO_2$ or about +0.008 per cation percent added. It has been observed in this composition system that the inclusion of $TiO_2$ in amounts more than about 1.5 cation percent causes a significant yellow coloration in the glass. Furthermore, as can be seen in Example 58, the presence of 2 cation percent $TiO_2$ is too great in this system, resulting in the development of opalization upon heat treatment. Accordingly, a content of about 1.5 cation percent (2.4 weight percent) $TiO_2$ has been deemed to comprise a practical maximum for commercial melting and forming.

In summary, the use of $TiO_2$ and $ZrO_2$ as the primary, if not only, refractive index-correcting components is the preferred practice of the invention. In the glass composition system involved herein, neither oxide appears to have any deleterious effect upon the photochromic properties.

When in the glassy state, $Al_2O_3 \cdot P_2O_5$ has the same structure as a silica glass except that the centers of the tetrahedra are formed alternately by aluminum and phosphorus ions. The resemblance of crystalline aluminum orthophosphate to quartz is also very strong. Consequently, the useful addition of phosphate to the photochromic alkali metal aluminoborosilicate glass compositions of the present invention would seem likely. We have found that inclusions of up to about 20% by weight $P_2O_5$ are indeed possible, while retaining photochromic behavior satisfying the objectives of the instant invention. It is necessary to make changes in the molar ratio $R_2O:B_2O_3$ as phosphate is added in like manner to such changes described above, for example, with reference to the addition of agents to adjust the refractive index of the glass.

Table XI lists several batch compositions in parts by weight on the oxide basis, Table XIA reports the base glass components therefor in cation percent, and Table XIB recites the base glass constituents in mole percent along with the molar ratio $R_2O:B_2O_3$. The use of the molar ratio $(R_2O-Al_2O_3):B_2O_3$ to impart acceptable photochromic properties to the glass is not applicable where the $P_2O_5$ content is 5% or greater. Inasmuch as the total of the batch ingredients tabulated in Table XI is very close to 100, the values of each can reasonably be deemed to reflect weight percent. The batches were melted in covered platinum crucibles for four hours at 1450° C. The melts were poured into slabs and the slabs held at ambient temperature to cool below red heat before being transferred to an annealer. The slabs were annealed at about 325°–350° C.

TABLE XI

|  | 59 | 60 | 61 | 62 | 63 | 64 |
|---|---|---|---|---|---|---|
| $SiO_2$ | 46.5 | 43.5 | 25.2 | 21.9 | 31.5 | 26.4 |
| $B_2O_3$ | 17.8 | 17.3 | 17.3 | 20.6 | 17.7 | 17.4 |
| $Al_2O_3$ | 13.2 | 14.0 | 24.6 | 24.0 | 21.4 | 23.5 |
| $Na_2O$ | 3.87 | 4.0 | 5.4 | 5.51 | 5.0 | 5.3 |
| $Li_2O$ | 1.78 | 1.76 | 1.88 | 1.92 | 1.88 | 1.88 |
| $K_2O$ | 5.61 | 5.53 | 5.94 | 6.05 | 5.92 | 5.92 |
| $P_2O_5$ | 5.63 | 6.95 | 19.4 | 19.8 | 16.4 | 19.3 |
| CuO | 0.012 | 0.012 | 0.012 | 0.012 | 0.012 | 0.012 |
| Ag | 0.3 | 0.3 | 0.3 | 0.3 | 0.3 | 0.3 |
| Cl | 0.24 | 0.24 | 0.24 | 0.24 | 0.24 | 0.24 |
| Br | 0.2 | 0.2 | 0.2 | 0.2 | 0.2 | 0.2 |

TABLE XIA

|  | 59 | 60 | 61 | 62 | 63 | 64 |
|---|---|---|---|---|---|---|
| $SiO_2$ | 39 | 37 | 21 | 17 | 25 | 21 |
| $B_2O_3$ | 25.7 | 25.4 | 23.7 | 27.7 | 24.3 | 23.9 |
| $Al_2O_3$ | 13 | 14 | 22 | 22 | 20 | 22 |
| $Na_2O$ | 6.3 | 6.6 | 8.3 | 8.3 | 7.7 | 8.1 |
| $Li_2O$ | 6 | 6 | 6 | 6 | 6 | 6 |
| $K_2O$ | 6 | 6 | 6 | 6 | 6 | 6 |
| $P_2O_5$ | 4 | 5 | 13 | 13 | 11 | 13 |

TABLE XIB

|  | 59 | 60 | 61 | 62 | 63 | 64 |
|---|---|---|---|---|---|---|
| $SiO_2$ | 56.1 | 54.0 | 34.6 | 29.1 | 40 | 34.7 |
| $B_2O_3$ | 18.5 | 18.5 | 19.6 | 23.7 | 19.4 | 19.8 |
| $Al_2O_3$ | 9.4 | 10.2 | 18.2 | 18.8 | 16.0 | 18.2 |
| $Na_2O$ | 4.5 | 4.8 | 6.9 | 7.1 | 6.2 | 6.7 |
| $Li_2O$ | 4.3 | 4.4 | 5.0 | 5.1 | 4.8 | 5.0 |
| $K_2O$ | 4.3 | 4.4 | 5.0 | 5.1 | 5.8 | 5.0 |
| $P_2O_5$ | 2.9 | 3.7 | 10.7 | 11.1 | 8.8 | 10.7 |
| $R_2O:B_2O_3$ | 0.71 | 0.74 | 0.86 | 0.92 | 0.81 | 0.84 |

As can be seen from Table XIA, the addition of phosphate was made on a 1:1 cation basis with $Al_2O_3$ for $SiO_2$. Stated differently, for each cation percent of $P_2O_5$ added one cation percent of $Al_2O_3$ was also added, and these together replaced two cation percent $SiO_2$.

The glass slabs were exposed to heat treatments recorded in Table XIC. For example, (660° C.−30′) and (580° C.−30′) indicate that the temperature of the slab was raised to 660° C. and 580° C. respectively, held thereat for 30 minutes and then quickly cooled. Table XIC reports the photochromic properties displayed by 2 mm thick ground and polished plates prepared from the slabs utilizing the solar simulator as the source of radiation. Examples 61 and 62 were examined utilizing the solar simulator at 27° C., 40° C., and −18° C., whereas data for Examples 59, 60, 63, and 64 are reported for 27° C. only. The legends in the table have the same significance as those in Table IC.

TABLE XIC

| | 27° C. Exposure | | | | | |
|---|---|---|---|---|---|---|
|  | 59 | 60 | 61 | 62 | 63 | 64 |
| $T_{D10}$ | 35 | 36 | 34 | 38 | 34 | 34 |
| $T_{F5}$ | 73 | 72 | 66 | 73 | 74 | 77 |
| $T_{F5} - T_{D10}$ | 38 | 36 | 32 | 35 | 40 | 43 |
| Heat Treatment | (660°-30′) | (660°-30′) | (580°-15′) | (580°-15′) | (600°-20′) | (600°-20′) |

| | 40° C. Exposure | |
|---|---|---|
|  | 61 | 62 |
| $T_{D10}$ | 44 | 50 |
| $T_{F5}$ | 80 | 82 |
| $T_{F5} - T_{D10}$ | 36 | 32 |

| | −18° C. Exposure | |
|---|---|---|
|  | 61 | 62 |
| $T_{D10}$ | 30 | 25 |

As can be observed from Table XIC, excellent photochromic properties can be secured in glasses containing up to 20% by weight $P_2O_5$. However, care must be exercised in the use of large amounts of $P_2O_5$. The development of opalization in the glass during the melting and forming processes must be guarded against, particularly where refractive index adjustment is undertaken with $TiO_2$ and/or $ZrO_2$. Furthermore, the chemical durability of high phosphate-containing glasses is frequently less than desired. Accordingly, about 25% by weight $P_2O_5$ has been deemed a practical maximum content. The substitution of $Al_2O_3 \cdot P_2O_5$ for $SiO_2$ requires a reduction in the total $SiO_2$ content to provide photochromic behavior satisfying the objectives of the present invention.

The most preferred composition from the standpoint of a glass exhibiting a refractive index of 1.523 such as to be useful for ophthalmic applications, while demonstrating highly desirable photochromic behavior, is set out below in terms of batch in parts by weight and the photochromic elements as analyzed via X-ray fluorescence in weight percent.

|  | Batch | Analyzed |
|---|---|---|
| $SiO_2$ | 56.46 |  |
| $Al_2O_3$ | 6.19 |  |
| $B_2O_3$ | 18.15 |  |
| $Li_2O$ | 1.81 |  |
| $Na_2O$ | 4.08 |  |
| $K_2O$ | 5.72 |  |
| $ZrO_2$ | 4.99 |  |
| $TiO_2$ | 2.07 |  |
| CuO | 0.006 | 0.006 |
| Ag | 0.252 | 0.207 |
| Cl | 0.195 | 0.166 |
| Br | 0.155 | 0.137 |

The batch was melted in a continuous melting unit customarily utilized in the commercial production of ophthalmic ware. Melting temperatures ranged between about 1300°–1400° C. as the glass passed through the unit. When subjected to a heat treatment in a continuous lehr consisting of heating to 650° C. and holding thereafter for 20 minutes, 2 mm thick ground and polished plate specimens exhibited the following photochromic behavior when exposed to the solar simulator source of radiation at temperatures of 40° C., 27° C., 20° C., 0° C., and −18° C. The legends employed below have the same significance as those of Table IC. $T_{D60}$ indicates the darkened transmittance of the glass after an exposure of 60 minutes to the solar simulator source.

|  | 40° C. | 27° C. | 20° C. | 0° C. | −18° C. |
| --- | --- | --- | --- | --- | --- |
| $T_{D60}$ | 47 | 28 | 22.5 | 19.5 | 20 |
| $T_{F5}$ | 81 | 67.5 | 55 | 24.5 | 21.5 |
| $T_{F5} - T_{D60}$ | 34 | 39.5 | 32.5 | 5 | 1.5 |

The above data clearly illustrate the darkening temperature independence of the inventive glass over the temperature range of −18° C. to 20° C., since the transmittance after a darkening exposure of 60 minutes is essentially the same.

As has been observed above, the strength of glassware to be used in ophthalmic applications is of very practical significance, particularly in the United States. Thus, the Food and Drug Administration has promulgated a regulation requiring lenses for spectacle use to be able to withstand the impact of a ⅝" diameter steel ball falling from the height of 50 inches. This requirement has necessitated the strengthening of glass lenses to be used for that purpose. The two processes customarily utilized for that purpose are thermal or air tempering and chemical strengthening. Both of those processes involve heating the glass with the concomitant possible disturbance of the photochromic properties.

For example, in the case of thermal tempering, the glass is heated to a temperature approaching the softening point thereof and then quickly quenched, customarily chilled in air. With chemical strengthening, the glass is commonly immersed into a bath of a molten salt operating at a temperature somewhat below the strain point of the glass. This immersion is continued for a sufficient length of time to cause ions from the molten salt to enter into and replace ions of the glass in a surface layer thereon, the ions from the glass passing out into the bath.

As was explained above, the photochromic properties of a glass are a function of the thermal history to which the glass has been exposed. Accordingly, the glass composition must be such that, after thermal tempering or chemical strengthening, the glass will display the desired photochromic properties.

Chemical strengthening has generally involved the exchange of large alkali metal ions from a bath of molten salt with smaller alkali metal ions in the glass. Hence, glasses amenable to chemical strengthening will normally contain $Li^+$ and/or $Na^+$ ions which will be replaced with Na and/or $K^+$ ions from a bath of molten salt.

In summary, glasses designed for ophthalmic applications will be properly index corrected and will preferably contain at least 4 cation percent of $Li_2O$ and/or $Na_2O$ to enable high strengths to be achieved via chemical strengthening. Furthermore, ions which appear to block the exchange reaction, such as $Ca^{+2}$ ions, will desirably be essentially absent from the glass compositions but may be included if deemed necessary for other purposes.

To illustrate the stability of the photochromic properties of the present glasses vis-a-vis the chemical strengthening process, specimens of the most preferred composition recited above were immersed into a bath of molten 40% $NaNO_3$ + 60% $KNO_3$ operating at 400° C. for a period of 16 hours after photochromic characteristics had been imparted thereto via the heat treatment schedule recited above as being applied to the most preferred composition. Measurements made on standard test bars indicated an average modulus of rupture of 32,000 psi. The break height for 2 mm thick ground and polished 50 mm round plate samples subjected to the above-described FDA test averaged in excess of 20 feet.

To verify that the chemical strengthening process had not rendered the photochromic properties of the most preferred glass composition unacceptable, 2 mm thick ground and polished plate samples, chemically strengthened in the manner described above, were exposed to bright outdoor sunlight on Mar. 9, 1978, a clear day with snow cover on the ground, for the one-hour period 1:15–2:15 P.M. at Corning, New York, at a temperature of approximately 13° C. Also, to confirm that the copper effect demonstrated in Table VI was still valid even after chemical strengthening, a specimen virtually identical in composition to the most preferred glass, except that the CuO concentration in the batch was 0.012 parts by weight instead of 0.006, was exposed to the outdoor sunlight at the same time. The melting conditions, thermal treatment, and chemical strengthening treatment were identical to those of the plate samples of the most preferred composition, the glass formed from the batch containing 0.012 parts by weight CuO having been melted two days prior to the most preferred composition samples in the same melting unit.

The table below reports the darkened transmittance measured after various periods of exposure as expressed in minutes. For example, $T_{D5}$ represents the darkened transmittance after five minutes, $T_{D10}$ represents the darkened transmittance after ten minutes, etc.

|  | Darkening at 13° C. | |
| --- | --- | --- |
|  | 0.006 CuO | 0.012 CuO |
| $T_{D5}$ | 22.4 | 18.7 |
| $T_{D10}$ | 21.6 | 18.0 |
| $T_{D15}$ | 21 | 17.4 |
| $T_{D45}$ | 20.3 | 16.5 |
| $T_{D60}$ | 19.1 | 15.6 |

The darkened plates were then brought indoors (∼22° C.) and the values tabulated below are measurements of transmittance after various periods in minutes of fading, e.g., $T_{F5}$ indicates the transmittance after five minutes fading, $T_{F10}$ represents the transmittance after ten minutes fading, etc.

| | Fading at 22° C. | |
|---|---|---|
| | 0.006 CuO | 0.012 CuO |
| $T_{F5}$ | 54.4 | 61.0 |
| $T_{F10}$ | 65.3 | 68.8 |
| $T_{F15}$ | 69.8 | 72.0 |
| $T_{F45}$ | 78.2 | 78.8 |
| $T_{F60}$ | 79.7 | 80.4 |

Sixty minute darkened transmittance values and sixty minute fading transmittance values for the same samples, as determined at various temperatures utilizing the solar simulator, are recorded below to provide a comparison with the above outdoor sunlight measurements.

| | 0.006 CuO | | | | |
|---|---|---|---|---|---|
| | 40° C. | 27° C. | 20° C. | 0° C. | −18° C. |
| $T_{D60}$ | 48 | 30.5 | 24.5 | 20.5 | 20.5 |
| $T_{F60}$ | 89.5 | 84 | 81 | 58 | 22.5 |
| $T_{F60} - T_{D60}$ | 41.5 | 53.5 | 56.5 | 37.5 | 2.5 |
| | 0.012 CuO | | | | |
| | 40° C. | 27° C. | 20° C. | 0° C. | −18° C. |
| $T_{D60}$ | 52.5 | 32.5 | 24 | 13 | 12.5 |
| $T_{F60}$ | 89 | 84.5 | 81.5 | 57 | 14.5 |
| $T_{F60} - T_{D60}$ | 36.5 | 52 | 57.5 | 46 | 2 |

The above data confirm the necessity for controlling the content of CuO within very narrow limits for a particular base glass where the concentrations of Ag, Cl, and Br are held constant. As can be observed, whereas the 0.012 CuO glass generally darkens to a lower transmittance value and fades more rapidly than the 0.006 CuO glass, it becomes unacceptably dark at low temperatures.

A comparison of the data obtained on the 0.006 CuO glass utilizing the solar simulator as the radiation source at 20° C. with the values recorded above upon exposure to sunlight shows good agreement therebetween. Also, it is of great practical significance to note the flatness of the darkening curve of transmittances demonstrated by the 0.006 CuO glass at temperatures between 20° C. and −18° C. Stated differently, the transmittance after a darkening exposure of 60 minutes is essentially the same throughout that range of temperatures.

We claim:

1. A transparent photochromic glass which, in bodies of 2 mm cross section, will exhibit the following properties:
    (a) at about 20° C. will darken to a luminous transmittance below 40% in the presence of actinic radiation; will fade at least 30 percentage units of transmittance after five minutes' removal from the actinic radiation; and will fade to a luminous transmittance in excess of 80% in no more than two hours after being removed from the actinic radiation;
    (b) at about 40° C. will darken to a luminous transmittance below 55% in the presence of actinic radiation; will fade at least 25 percentage units of transmittance after five minutes' removal from the actinic radiation; and will fade to a luminous transmittance in excess of 80% in no more than two hours after being removed from the actinic radiation; and
    (c) at about −18° C. will not darken to a luminous transmittance below 15% in the presence of actinic radiation;
    said glass having a base composition consisting essentially, in weight percent on the oxide basis, of 0–2.5% $Li_2O$, 0–9% $Na_2O$, 0–17% $K_2O$, 0–6% $Cs_2O$, 8–20% $Li_2O + Na_2O + K_2O + Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, the molar ratio of alkali metal oxide:$B_2O_3$ ranging between about 0.55–0.85, where the composition is essentially free from divalent metal oxides other than CuO, and the weight ratio Ag:(Cl+Br) ranges about 0.65–0.95.

2. A photochromic glass according to claim 1 wherein said $P_2O_5$ content is no more than 5% and said $SiO_2$ content is 45–65%, the molar ratio (alkali metal oxide-$Al_2O_3$):$B_2O_3$ ranges between about 0.25–0.4.

3. A photochromic glass according to claim 1 wherein to said base composition are added up to 10% by weight total of the following extraneous ingredients in the indicated proportions of up to 6% $ZrO_2$, up to 3% $TiO_2$, up to 0.5% PbO, up to 7% BaO, up to 4% CaO, up to 3% MgO, up to 6% $Nb_2O_5$, up to 4% $La_2O_3$, and up to 2% F; and up to 1% total of transition metal oxides and/or up to 5% total of rare earth metal oxides as colorants.

4. A photochromic glass according to claim 1 wherein CuO is present in an amount of 0.005–0.011%, Ag is present in an amount between 0.175–0.225%, Cl is present in an amount of 0.12–0.225%, and Br is present in an amount between 0.1–0.15%.

5. A photochromic glass according to claim 2 and also containing up to 6% $ZrO_2$ and/or up to 6% $Nb_2O_5$ wherein the molar ratio of (alkali metal oxide-$Al_2O_3$-$ZrO_2$ and/or $Nb_2O_5$):$B_2O_3$ ranges between about 0.25–0.4.

6. A photochromic glass according to claim 1 having a refractive index suitable for ophthalmic applications and having the capability of being chemically strengthened which contains at least 4 cation percent of $Li_2O$ and/or $Na_2O$.

7. A photochromic glass according to claim 1 having a refractive index of 1.523 and the capability of being chemically strengthened having a base glass composition of the following approximate values, expressed in parts by weight of:

| | |
|---|---|
| $SiO_2$ | 56.46 |
| $Al_2O_3$ | 6.19 |
| $B_2O_3$ | 18.15 |
| $Li_2O$ | 1.81 |
| $Na_2O$ | 4.08 |
| $K_2O$ | 5.72 |
| $ZrO_2$ | 4.99 |
| $TiO_2$ | 2.07 | and containing photochromic elements, as analyzed in weight percent of about:

| | |
|---|---|
| CuO | 0.006 |
| Ag | 0.207 |
| Cl | 0.166 |
| Br | 0.137 |

8. A photochromic glass according to claim 1 wherein said glass contains no $Li_2O$ and/or $Na_2O$.

* * * * *

UNITED STATES PATENT AND TRADEMARK OFFICE
CERTIFICATE OF CORRECTION

PATENT NO. : 4,190,451

DATED : February 26, 1980

INVENTOR(S) : George B. Hares et al.

It is certified that error appears in the above-identified patent and that said Letters Patent are hereby corrected as shown below:

Column 13, line 45, change "facing" to -- fading --.

Column 13, line 57, change "demonstrates" to -- demonstrate --.

Column 19, line 29, change "Cuo" to --CuO--.

Column 27, line 3 of Table X, under Example 55, change "15.92" to --16.79--.

Column 27, line 3 of Table X, under Example 56, change "16.70" to --15.92--.

Column 27, line 3, of Table X, under Example 57, change "16.24" to --16.70--.

Column 27, line 3 of Table X, under Example 58, insert --16.24--.

Column 28, line 51, change "300.005" to -- +0.005--.

Signed and Sealed this

Fourth Day of November 1980

[SEAL]

Attest:

SIDNEY A. DIAMOND

Attesting Officer

Commissioner of Patents and Trademark